(12) United States Patent
Mondello et al.

(10) Patent No.: US 9,761,034 B2
(45) Date of Patent: Sep. 12, 2017

(54) ANIMATION EMULATING LIVE WEB PAGE CONTENT RESIZING

(71) Applicant: Apple Inc., Cupertino, CA (US)

(72) Inventors: Richard J. Mondello, San Jose, CA (US); Kevin W. Decker, Los Altos, CA (US); Damian Kaleta, San Jose, CA (US); Steven J. Falkenburg, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 14/298,813

(22) Filed: Jun. 6, 2014

(65) Prior Publication Data

US 2014/0365959 A1 Dec. 11, 2014

Related U.S. Application Data

(60) Provisional application No. 61/832,955, filed on Jun. 9, 2013.

(51) Int. Cl.
*G06F 17/30* (2006.01)
*G06T 13/80* (2011.01)

(52) U.S. Cl.
CPC .......... *G06T 13/80* (2013.01); *G06F 17/3089* (2013.01)

(58) Field of Classification Search
CPC ................................................... G06F 3/0481
See application file for complete search history.

(56) References Cited

U.S. PATENT DOCUMENTS

| 7,325,204 | B2 | 1/2008 | Rogers | |
| 7,461,340 | B1* | 12/2008 | Mauceri, Jr. | G06F 17/211 715/243 |
| 8,255,824 | B2 | 8/2012 | Selig | |
| 8,286,078 | B2* | 10/2012 | Yi | G06F 3/0488 715/273 |
| 8,307,278 | B1* | 11/2012 | Spear | G06F 17/30905 715/240 |
| 8,312,385 | B2 | 11/2012 | Bier | |
| 8,448,074 | B2 | 5/2013 | Forutanpour et al. | |
| 8,913,076 | B1* | 12/2014 | Aggarwal | G09G 5/14 345/592 |
| 2007/0013699 | A1* | 1/2007 | Nelson | G06T 13/00 345/473 |
| 2007/0180381 | A1* | 8/2007 | Rice | G06F 17/30905 715/711 |
| 2008/0079655 | A1* | 4/2008 | Fujii | G06T 11/60 345/1.2 |

(Continued)

OTHER PUBLICATIONS

Internet Explorer Favorites—Mar. 16, 2011.*

*Primary Examiner* — David Choi
(74) *Attorney, Agent, or Firm* — Fenwick & West LLP

(57) ABSTRACT

The embodiments disclosed herein describe ways that a browser application can smoothly animate changing (i.e., decreasing, increasing) web page content width upon opening or closing of a sidebar. Methods include the browser analyzing the web page layout to identify a dominant page portion or to determine whether a centered portion layout exists, temporarily obscuring the web page with a snapshot of the page, identifying the location and size of the dominant or centered portion on the web page, and using the information to make changes to the web page in a layer hidden behind the snapshot.

14 Claims, 25 Drawing Sheets

(56) References Cited

U.S. PATENT DOCUMENTS

| | | | | |
|---|---|---|---|---|
| 2013/0095864 A1* | 4/2013 | Marovets | ............... | H04W 4/14 |
| | | | | 455/466 |
| 2013/0254652 A1* | 9/2013 | Chinosornvatana | .. | G06F 17/211 |
| | | | | 715/234 |
| 2014/0089472 A1* | 3/2014 | Tessler | .................... | H04L 67/02 |
| | | | | 709/219 |
| 2014/0365959 A1* | 12/2014 | Mondello | ........... | G06F 17/3089 |
| | | | | 715/790 |

* cited by examiner

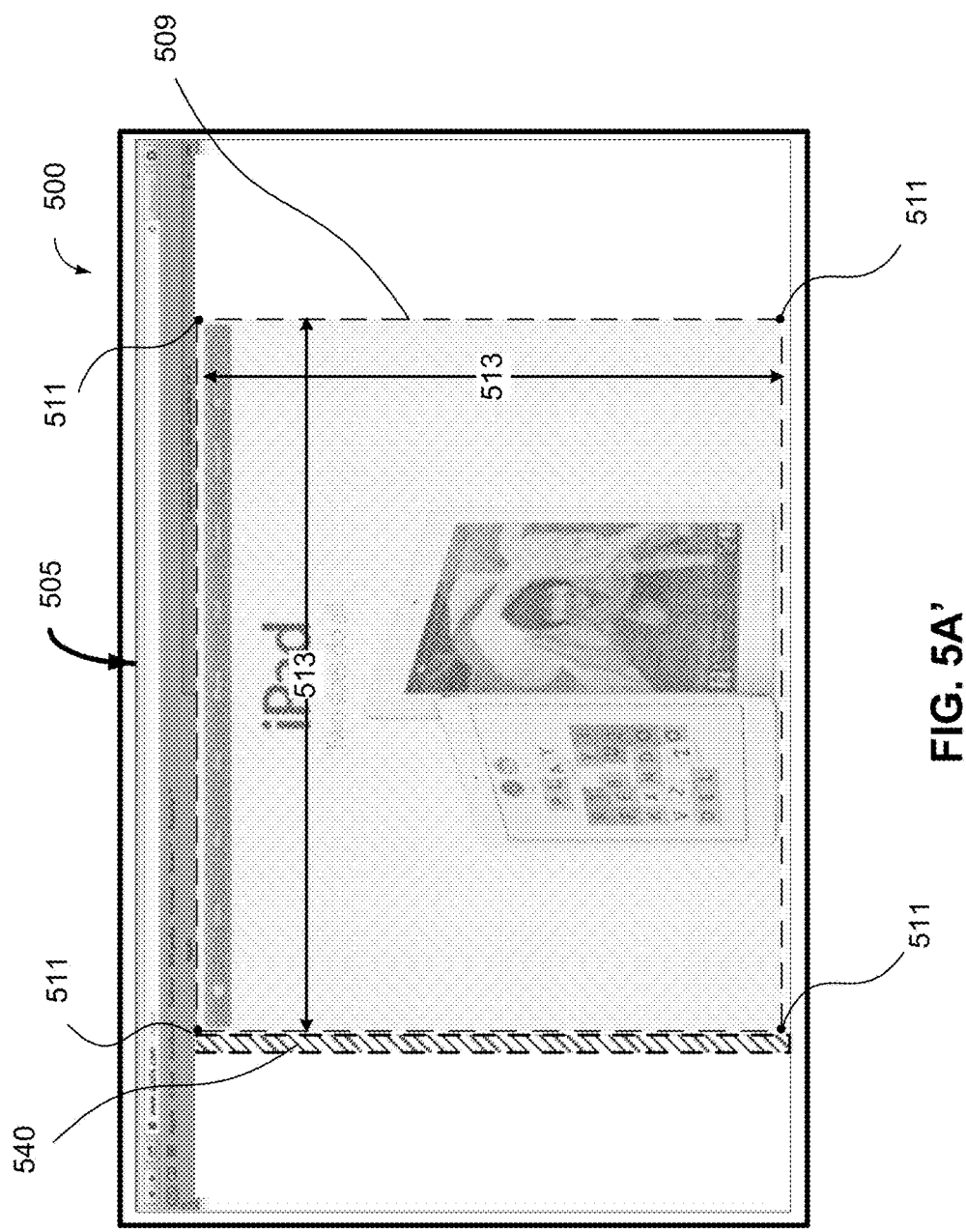

ANIMATION EMULATING LIVE WEB PAGE CONTENT RESIZING

This case claims the benefit of U.S. Patent Application Ser. No. 61/832,955, filed Jun. 9, 2013, titled "Animation Emulating Live Web Page Content Resizing," which is incorporated by reference in its entirety.

BACKGROUND

1. Field of Technology

The embodiments generally relate to a browser application animation adjusting web page content width that emulates a live web page resize. More particularly, the embodiments relate to adjusting the dominant page portion of a web page to accommodate opening or closing of a sidebar.

2. Background

Web pages can vary in layout and behavior, and structures used in conjunction with web pages, such as sidebars, are now widely used. When a new element is introduced into the space of the webpage, typically an animation is used to introduce the element, e.g., a sidebar opening onto the page. In this example, a browser typically is not fast enough to continuously re-lay out the content on the page—for example by re-wrapping text, and repositioning images on the page—while the sidebar appears so that the animation is smooth. For example, the browser engine cannot shrink or grow the page horizontally at 60 frames per second, especially for web sites with rich content. As a result, as an element such as a sidebar opens in the page, the sidebar is displayed at relatively small number of discrete locations between its closed position and its final position. This creates the appearance of a visual jitter, as if the sidebar is jumping from one position to the next. A similar problem is present upon closing of the sidebar, which would leave vacant width unless filled in.

SUMMARY

A browser application is configured to animate changing web page content size, for example when a sidebar is displayed, in a way that emulates the process that would occur if the browser could re-layout the page at 60 frames per second as the sidebar sides into view.

In one aspect, a browser analyzes the layout of a web page to identify a dominant portion of the web page forming the first layer of a visible display. The browser snapshots the web page and places the snapshot as a second layer of the visible display, in front of and obscuring the first layer. In the obscured first layer, the browser shifts the dominant page portion away from one side of the web page, and displays a sidebar on the side that takes the place of the dominant page portion as it moves away from the side. In the second layer, a sidebar equal in size to the sidebar of the first layer is displayed from the same side as the sidebar in the first layer, concurrent with shifting the snapshot away from that side to accommodate the sidebar. The snapshot of the page can be moved using a graphics processing unit in a way that appears to the user as if the browser as re-rendered at 60 frames per second. The visible display is updated to remove the second layer, thereby revealing the first layer that has the sidebar displayed. This process creates the smooth appearance of the animation, and because the sidebar portions and dominant page and snapshot portions, respectively are aligned, the removal of the second layer is not visibly apparent to the user. For page layouts without centered portions, a different technique repositions a snapshot of the web page to temporarily replace the web page while it is resized in the background and the revealed.

Similarly, upon a user action to remove the sidebar, a snapshot of the page with the sidebar temporarily obscures the webpage as a second layer, and once the sidebar is removed in the obscured first layer and the webpage resized, the snapshot is shifted toward the sidebar side and faded away such that the first layer webpage is revealed.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Methods and apparatuses for animations changing web page content widths are described herein according to one embodiment. According to another embodiment, the animations described herein are accomplished via computer program products. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment. References to entities in the singular should be understood to encompass the plural, as appropriate for the context.

The processes depicted in the figures that follow are performed by processing logic that comprises hardware (e.g., circuitry, dedicated logic, etc.), executing software which configures the hardware to perform the described functionality. Although the processes are described below in terms of some sequential operations, it should be appreciated that some of the operations described may be performed in different order. Moreover, some operations may be performed in parallel rather than sequentially. Finally, one of skill in the art appreciates that all embodiments of the invention are inherently and necessarily executed by a computer device, and are not performed in the human mind by mental steps.

System Environment

Figure 1:
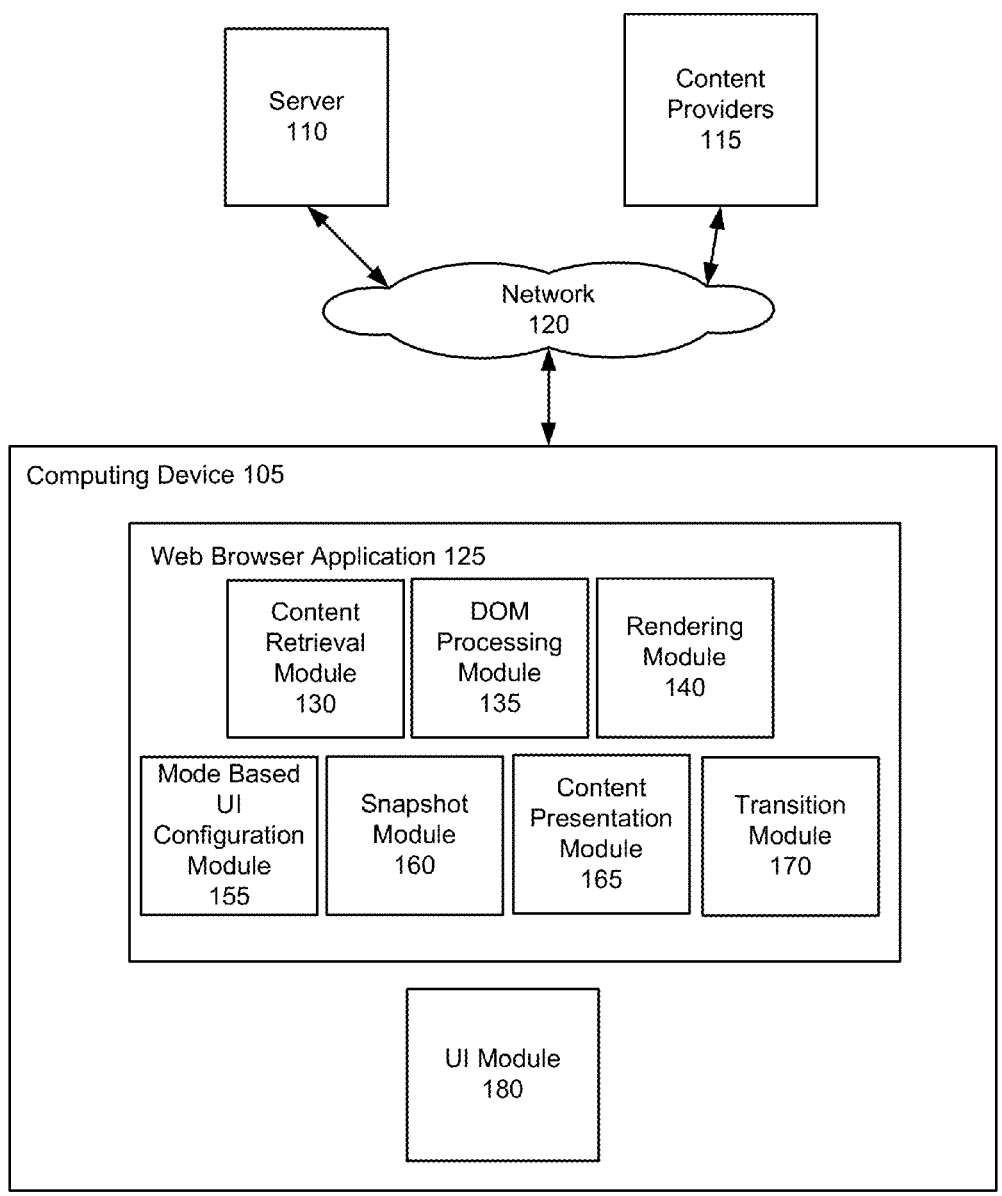
FIG. 1 is a high-level block diagram of a computing environment for animations adjusting web page content according to one embodiment.

FIG. 1 is a high-level block diagram of a computing environment 100 for an animation adjusting web page content width. The system 100 includes one or more computing devices 105, one or more servers 110, one or more content providers 115, and a network 120.

The content provider 115 provides articles such as web pages to the computing device 105. The term 'articles,' as used herein, is used in the general sense to refer to documents, web pages, and other content. A web site is an example of a content provider 115. Although only a single content provider 115 is shown in FIG. 1, a plurality of content providers may be in communication with the computing device 105.

The computing device 105 is an electronic device such as a desktop computer (e.g., an iMac™), a laptop computer (e.g., MacBook™), a tablet computer (e.g., iPad™), a mobile phone (e.g., iPhone™), a media device (e.g., iPod™), etc., each from Apple Inc. Generally, the computing device 105 is configured to enable a user to view articles provided by the content provider 115 or server 110. The server 110 may be any computing device or a cloud server, such as iCloud™, and may be a general purpose computer or server-level computer as described in conjunction with FIG. 2. The network 120 may include any combination of local area and/or wide area networks, using both wired and wireless communication systems.

The computing device 105 includes a web browser application 125, such as browser, such as Safari® from Apple Inc. The web browser application 125 includes a plurality of modules: content retrieval module 130, DOM processing module 135, rendering module 140, mode based UI configuration module 155, snapshot module 160, content presentation module 165, and transition module 170.

As is known in the art, the term "module" refers to computer program logic, which is executed by the processor of the computing device, which configures the computing device to provide the specified functionality. Other embodiments of the web browser 125 and/or computing device 105 can have different and/or other modules than the ones described here, and that the functionalities can be distributed among the modules in a different manner.

Content retrieval module 130 is configured to retrieve articles (i.e., documents, web pages, and other content) via a network 130 from a remote server 110 or other content provider 115 or a local file system, and is one means for performing this function. Documents received can be hypertext based, such as HTML (Hyper Text Markup Language), DHTML (Dynamic HTML), XML (Extensible Markup Language), or other markup languages, as well as CSS (Cascading Style Sheets), JavaScript, and any other page presentation or control mechanisms.

DOM processing module 135 is configured to process (i.e., parse) a document to identify document elements and generate a document object model (DOM) tree out of the document elements, and is one means for performing this function. A document element may be a hypertext element such as an HTML tag in an HTML document. A DOM tree may represent a topological or structural relationship among the document elements. Each node in a DOM tree of a document may correspond to one document element of the document. Document elements may include document content and/or layout specifications, such as size attributes associated with HTML tags in an HTML document, for presenting the document content. In one embodiment, the DOM processing module 135 is configured to analyze a web page to determine a dominant page portion and its location, whether a page includes a centered portion framed by first and second side gutter portions, to determine the widths of the portions (e.g., by identifying a width of columns substantially identical between the first and second side gutter portions, and to repeat the comparing of adjacent columns), to determine if each meets a threshold width.

Rendering module 140 generates rendering information, such as layout parameters (e.g., sizing data of rectangular portions, coordinate locations, offset locations) for each node in a DOM tree for presenting a corresponding document, and is one means for performing this function. Rendering module 140 can make rendering decisions according to configurations including layout specifications in a document, user interface settings for web browser application 125 and/or other system settings, etc. Rendering module 140 also can identify page portions corresponding to nodes in the DOM tree, and locations on the web page, as described in conjunction with FIGS. 4B and 8B. A web page may be represented by a rendered DOM tree via rendering module 140. In one embodiment, rendering module 140 may be the WebKit layout engine, which allows web browsers to render web pages.

Mode based UI configuration module 155 configures the off screen web page content width and other size and location adjustments, and is one means for performing this function. Mode based UI configuration module 155 may configure the off screen layers for adjusting the web page width in a way that is not visible to the user (e.g., hidden elements), and may allow a user to set parameters related to transitions, for example, a cache size to be used, a transition sensitivity, rate of changes in opacity, cross-fades between layers, etc.

Snapshot module 160 generates and/or manages snapshots that are be utilized as described herein, and is one means for performing this function. For example, the snapshot module 160 may capture snapshots of the web page as described herein. The ability to layer content "in front of" other content from the perspective of a viewing user is fundamental technique possible using any system with a view/window hierarchy, such as Macintosh OS X, iOS, or Windows.

Transition module 170 detects navigation events, processes transitions between snapshots and resized web pages, and is one means for performing this function. For example, the transition module 170 may facilitate updates of the displayed web page to temporarily display a snapshot of the web page instead of the web page content itself, and then to later replace the snap shot with an updated web page.

Transitions may be by way of cross-fade, changes in opacity of layers, or other gradual transition.

Computing device 105 also includes a UI module 180 that controls presentation of graphical user interface aspects on the display, for example, for providing the user interfaces described herein.

Figure 2:
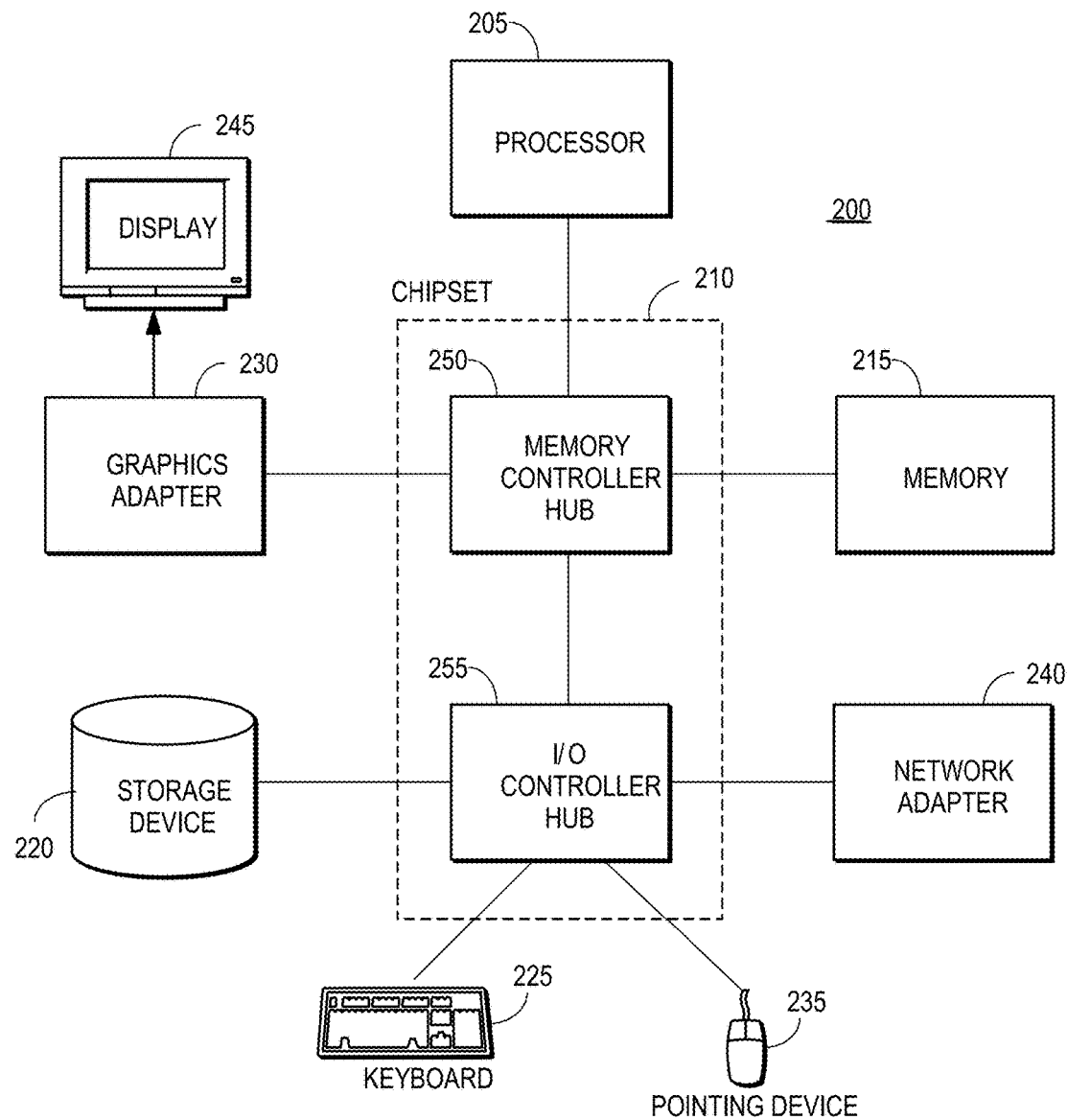
FIG. 2 is a high-level block diagram illustrating a typical computer for acting as the computing device and/or cloud server according to one embodiment.

FIG. 2 is a high-level block diagram of a computer 200 for acting as the computing device 105 or server 110. Illustrated are at least one processor 205 coupled to a chipset 210. Also coupled to the chipset 210 are a memory 215, a storage device 220, a keyboard 225, a graphics adapter 230, a pointing device 235, and a network adapter 240. A display 245 is coupled to the graphics adapter 230. In one embodiment, the functionality of the chipset 210 is provided by a memory controller hub 250 and an I/O controller hub 255. In another embodiment, the memory 215 is coupled directly to the processor 205 instead of the chipset 210.

The storage device 220 is any non-transitory computer-readable storage medium, such as a hard drive, compact disk read-only memory (CD-ROM), DVD, or a solid-state memory device. The memory 215 holds instructions and data used by the processor 205. The pointing device 235 may be a mouse, track ball, touch panel, or other type of pointing device, and is used alone or in combination with the keyboard 225 to input data into the computer system 200.

The terms "click," "hover," "button selection," etc., as used herein to refer to a user action by way of a pointing device 235, means any user inputs that are received by the computing device 105. These inputs may be manifested by includes touch-screen actions such as tapping, double tapping, holding a finger on the touch screen, swiping, pinching, etc., as commonly used on single-touch and multi-touch enabled devices. The graphics adapter 230 displays images and other information on the display 245. The network adapter 240 couples the computer system 200 to a local or wide area network, such as network 120 of FIG. 1.

As is known in the art, a computer 200 can have different and/or other components than those shown in FIG. 2. In addition, the computer 200 can lack certain illustrated components. In one embodiment, a computer 200 acting as the server 110 may lack a keyboard 225, pointing device 235, graphics adapter 230, and/or display 245. Moreover, the storage device 220 can be local and/or remote from the computer 200 (such as embodied within a storage area network (SAN)). As is known in the art, the computer 200 is adapted to execute computer program modules for providing functionality as described herein. In one embodiment, program modules are stored on the storage device 220, loaded into the memory 215, and executed by the processor 205.

The methods and systems herein describe ways to animate changing (i.e., decreasing, increasing) web page content width (e.g., width), for example when a sidebar displayed or removed, which animations approximate what a user would see if the browser was fast enough to continuously re-layout the content on the web page as the sidebar appears or is removed.

Figure 3A:
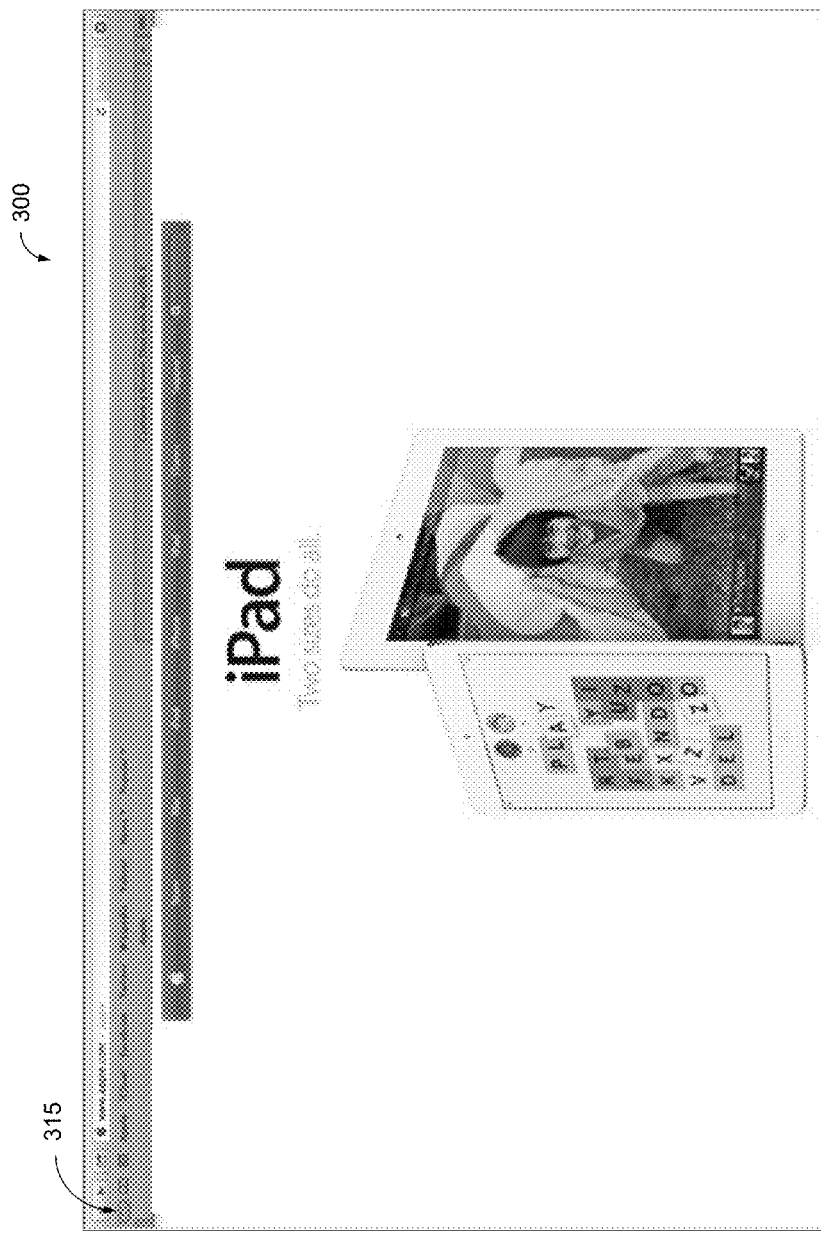
FIGS. 3A-3D illustrate various configurations of a graphical user interface (GUI) for a browser displaying a web page according to one embodiment.
Figure 3B:
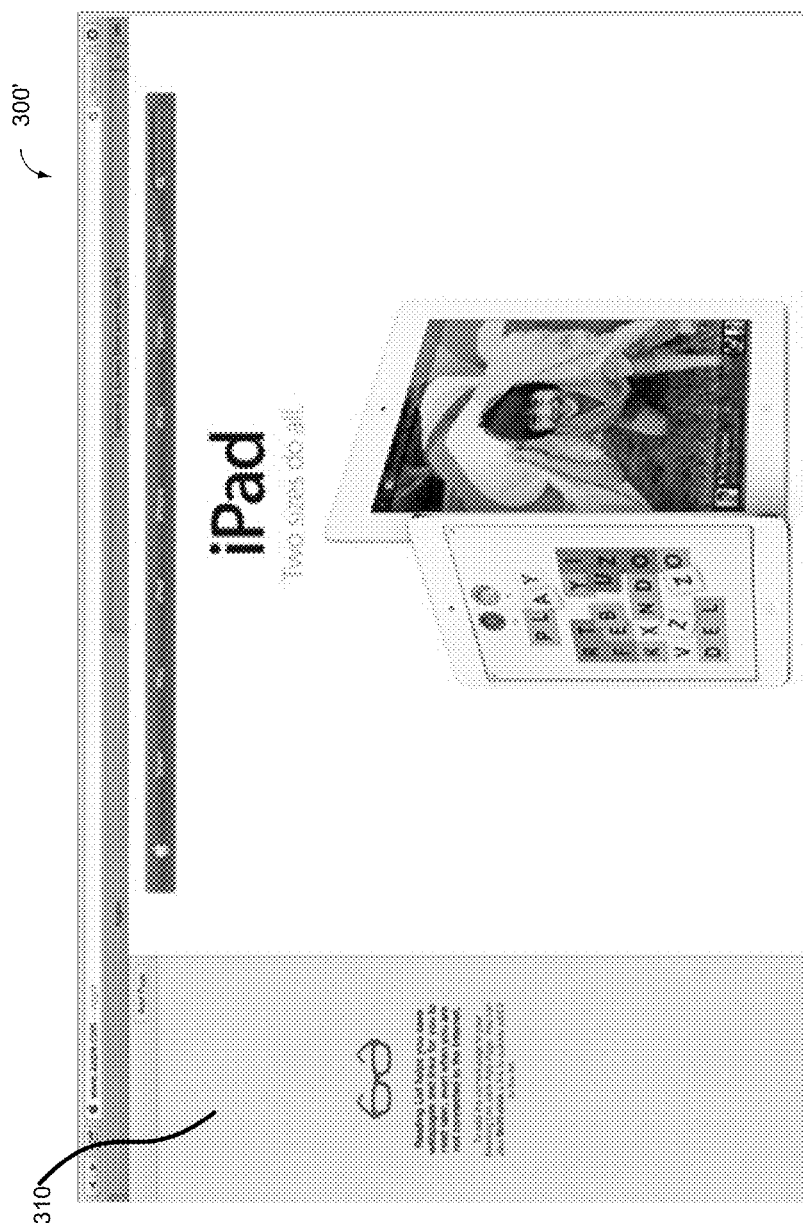
Figure 3C:
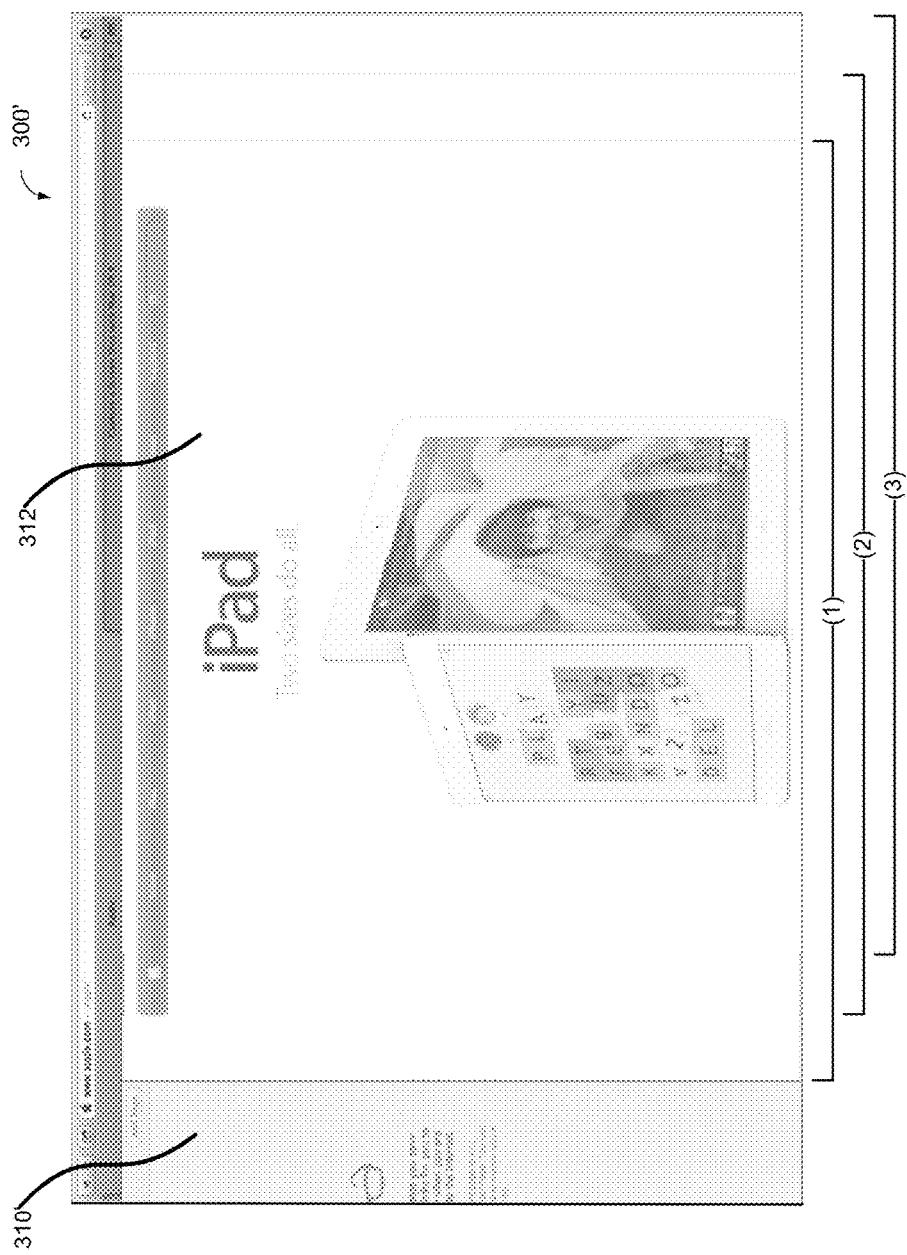

FIG. 3A illustrates a graphical user interface (GUI) for a conventional browser displaying a web page 300. FIG. 3B illustrates a similar GUI for a browser displaying a web page 300' including a sidebar 310. In a conventional browser, upon introduction of the sidebar 310 onto the web page 300, i.e., during the transition from FIG. 3A to FIG. 3B, as the sidebar 310 appears from the one edge (e.g., the leftmost edge) of the web page to its position as shown in FIG. 3B, a visual jitter, or stutter movement, was seen, as depicted in FIG. 3C as the sidebar 310' and content 312 is displayed at a small number of discrete positions (1), (2), and (3) between the user interface 300 of FIG. 3A and the user interface 300" of FIG. 3B. The visual jitter was due to the fact that the browser was unable to re-compute the re-lay out of the content on the web page 300 fast enough to display the sidebar appearing at a large number of positions as it moves into its final position as shown in FIG. 3B, in order to create the visual appearance of the sidebar smoothly sliding from its closed position to its open position. This is because each change in the location of the right edge of the sidebar requires a re-computation of the layout of the web page content, i.e., the positioning of images on the pages and kerning and wrapping of text. Because these layout computations are time consuming, and because the sidebar needs to open within a fixed amount of time (e.g., one second) the browser can only re-compute the layout a smaller number of times, such as three times. The same visual jitter was seen upon closing of the sidebar 310 as it slid away into the edge (e.g., the leftmost edge) of the web page 300.

Method Flow

Figure 4A:
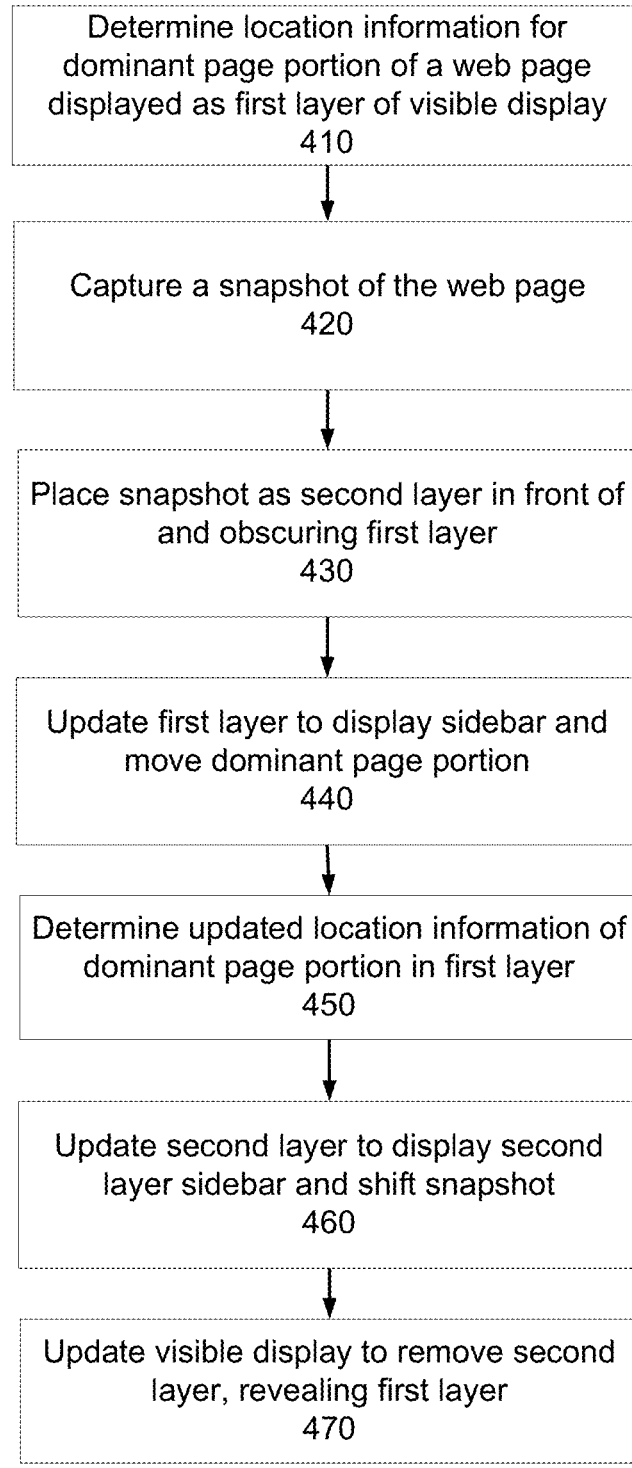
FIGS. 4A and 4B are flowcharts illustrating methods of rendering a web page during the presenting of a sidebar according to one embodiment.
Figure 4B:
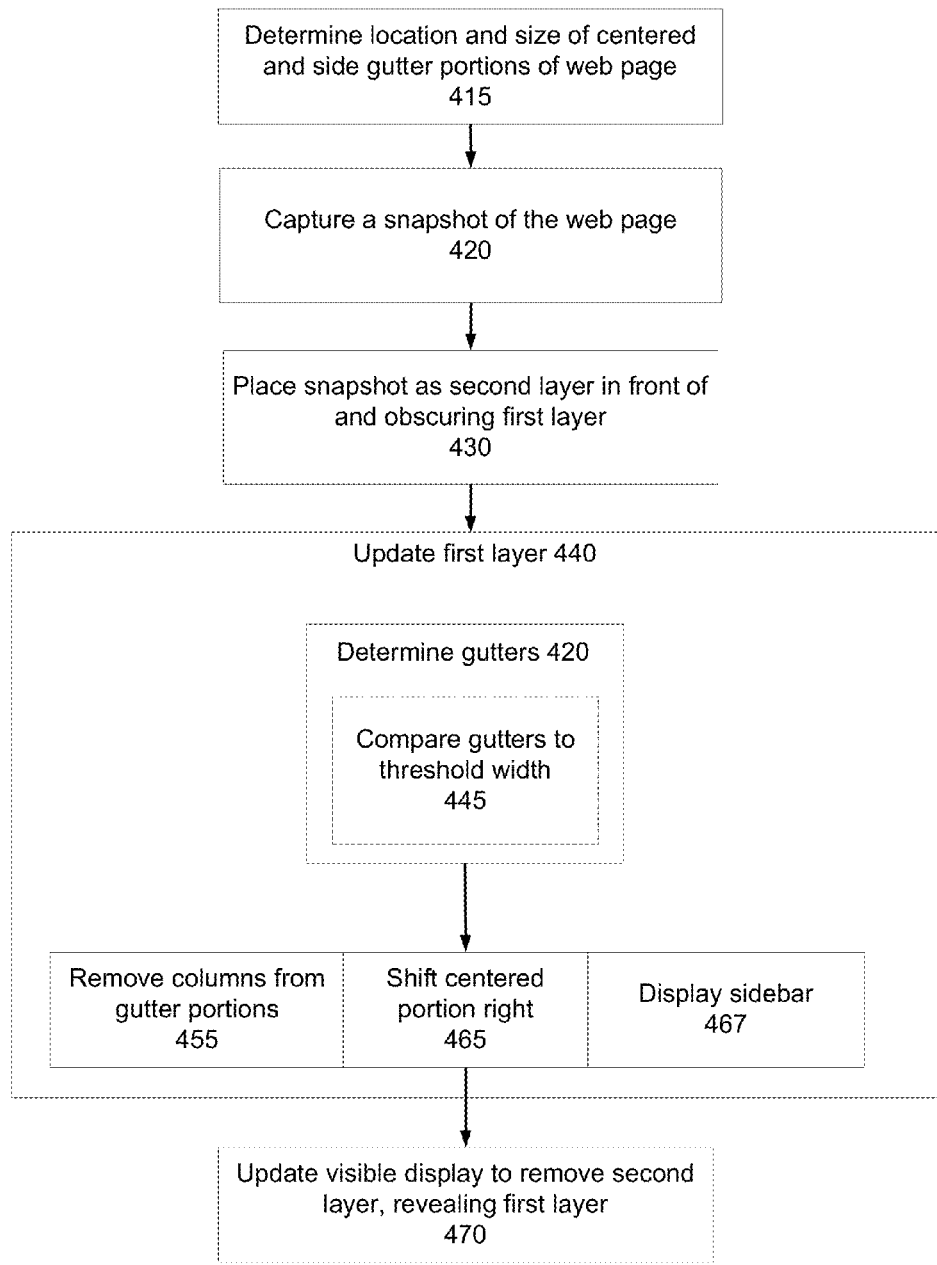

FIGS. 4A and 4B are flowcharts illustrating methods of rendering a web page during the presenting of a sidebar, thereby adjusting web page content to approximate what the user would see if the browser 125 could re-layout the content fast enough to keep up with the opening of the sidebar. Referring also to FIGS. 5A-5E, various configurations of a graphical user interface (GUI), each figure representing the GUI as it appears during the various steps of FIGS. 4A and 4B.

Figure 5A:
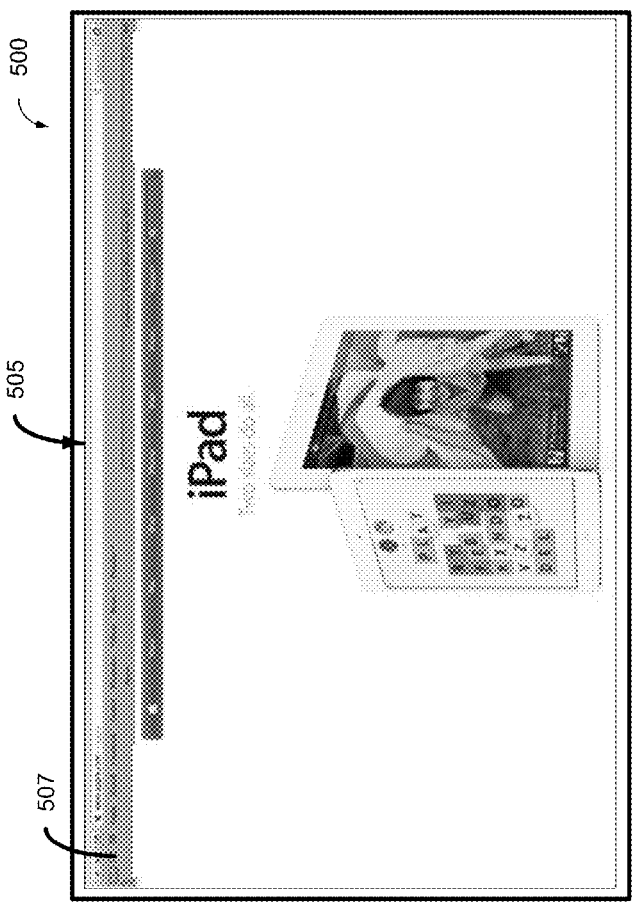
FIGS. 5A-5E illustrate various configurations of a GUI as it appears during the various steps of FIGS. 4A and 4B.
Figure 5A:
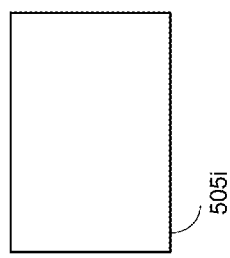
Figure 5B:
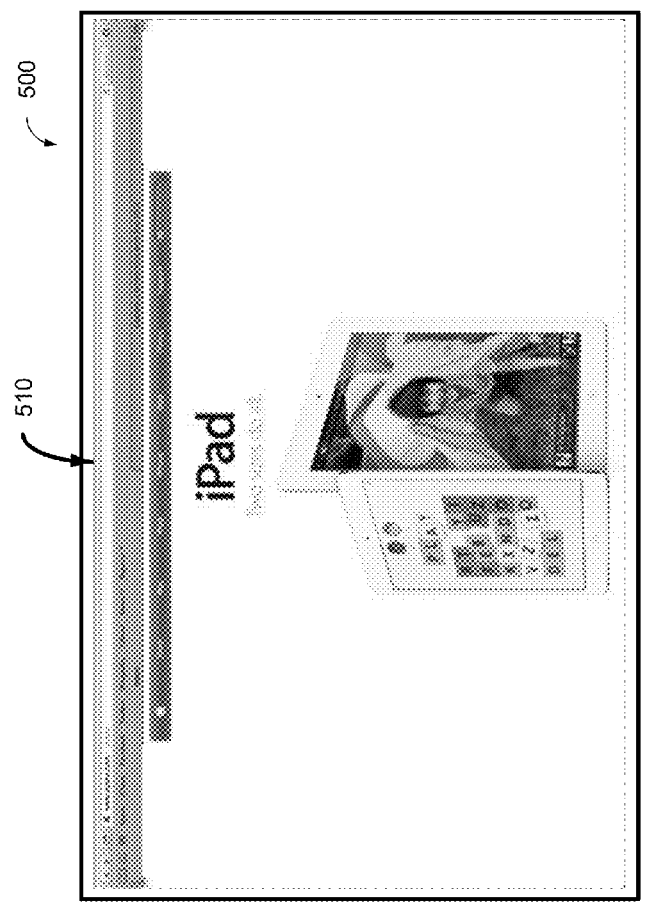
Figure 5B:
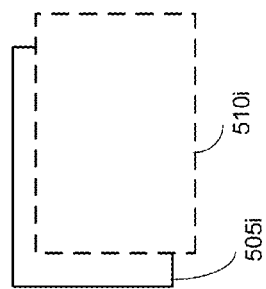

FIG. 4A illustrates a method of an animation decreasing web page content width according to one embodiment. The method is triggered upon receiving a user action to display a sidebar. As shown in FIG. 5A, a web page is displayed as first layer 505 of a visible display 500 of a user interface. For each of FIGS. 5A-5E, a miniature representation of the web page layers 505i is shown at the top left corner. For example, the user action triggering the animation method described in FIG. 4A may be selection of a button (via pointer device or touch), e.g., button 507 of FIG. 5A, which corresponds to various a reading list maintained by the browser 125.

As a first step of the method of FIG. 4A, the browser 125 determines 410 the layout of various web page portions on the page corresponding to nodes in the document object model (DOM) tree of the page elements. Location information for a dominant page portion of the web page first layer 505 is determined 410, e.g., by the DOM processing module 135 and rendering module 140, as described above in conjunction with FIG. 1. The dominant page portion is the element in the DOM that the browser 125 identifies as holding the greatest amount of content relevant to the user. The browser 125 keeps a reference to the dominant page portion and captures its geometry, e.g., x and y coordinates, (width, height). Referring briefly to FIG. 5A', a visualization of the dominant page portion is shown for the web page first layer 505, as represented by a semitransparent box 509. For example, FIG. 5A' shows four black dots 511 representing corner locations for x,y coordinates of the box 509, and double headed arrows 513 show the width and length measurements 513 captured. The visualization of FIG. 5A' is merely demonstrative; the box 509 and geometry (511, 513) is not visible to the user. Rather, during the determining 420, the visible display 500 remains as shown in FIG. 5A. Alternatively to step 410, a pixel-analysis-based approach could be used to determine the layout, e.g., as described below in conjunction with step 415 of FIG. 4B.

Next, a snapshot of the web page first layer 505 is captured 420, e.g., via snapshot module 160. Then, the snapshot, shown in FIG. 5B as 510 (dotted outline), is placed 430 as a second layer 510 in front of and obscuring the first layer 505. As shown in the miniature representation of FIG. 5B, the snapshot layer 510*i* is in front of the web page first layer 505*i*. A more detailed description of the process for using snapshots in browsing transitions is described in application Ser. No. 13/224,903, titled "Techniques for Use of Snapshots with Browsing Transitions," which is incorporated herein by reference.

Figure 5C:
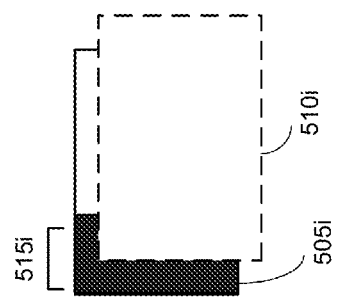
Figure 5C:
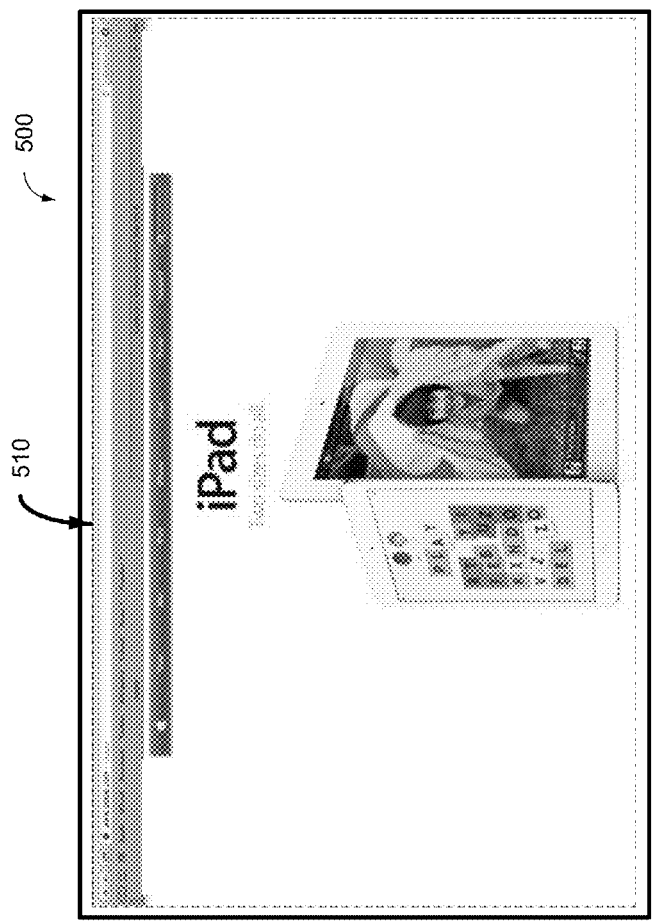

Next, using the information determined 420 about the dominant page portion of the web page first layer 505, the first layer 505 is updated 440 to display a sidebar at a first side of the first layer 505, with the dominant page portion having moved away from the first side to accommodate the sidebar. If any visual jitter happens upon this resizing, it is not visible to the user since it is the first (back) layer 505. As shown in FIG. 5C, this step 440 is not visually distinguishable to the user from the previous step. However, as shown in the miniature representation of FIG. 5C, the sidebar 515*i* of the miniature first layer 505*i* is shown in a darker color. Because the first layer 505 is behind the second snapshot layer 510, the first layer 505 is obscured.

Figure 5D:
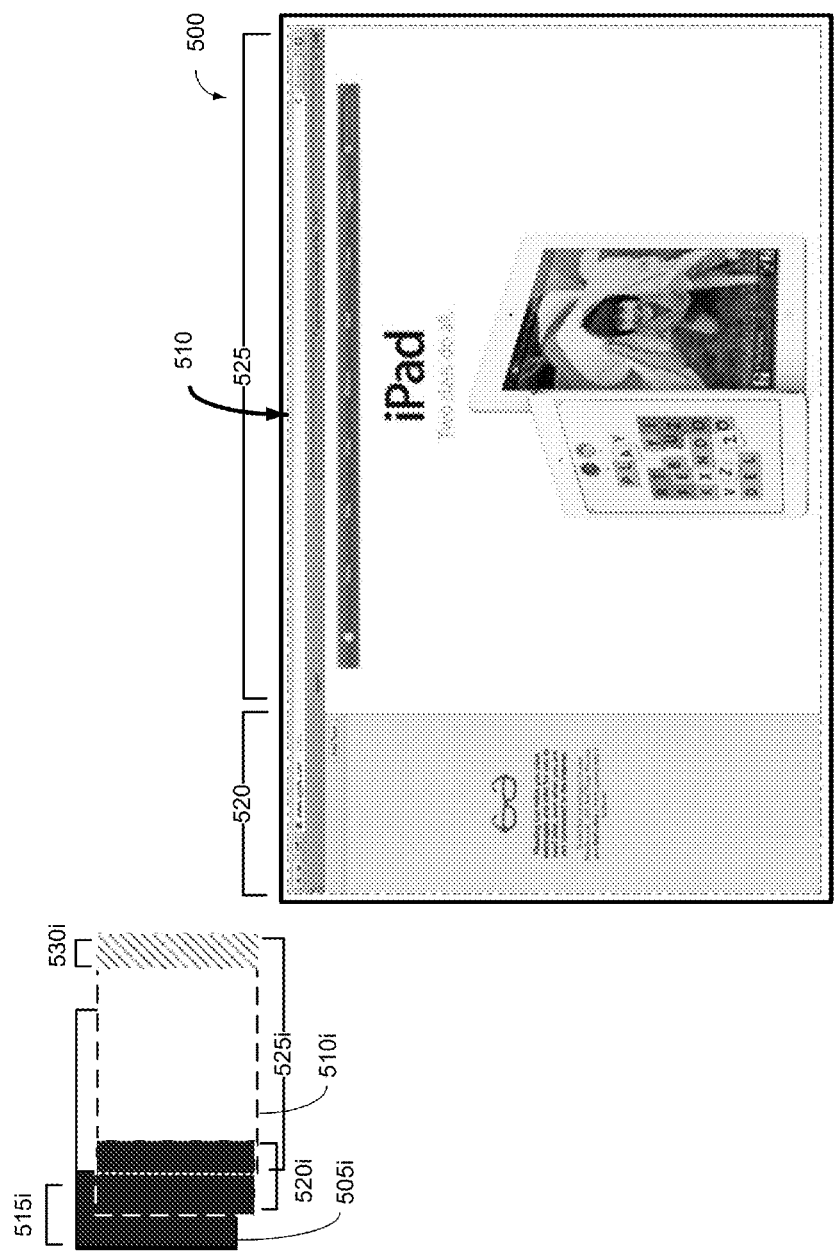

From the movement of the dominant page portion of the first layer 505, updated location information for the dominant page portion is determined 450, e.g., by the same process described above in conjunction with FIG. 5A', with the rendering module 160 capturing the new geometry (e.g., x and y coordinates, width, height). Using the updated location information, next the second snapshot layer 510 is updated 560 to display a sidebar 520 at the first side of the second layer 510, and the snapshot 525 is shifted away from the first side to accommodate the sidebar, as shown in FIG. 5D. Recall that the reason for the visual jitter upon display of the sidebar 310 in the prior art, as discussed in conjunction with FIG. 3C, was that the content of the web page 312 could not be re-layed out fast enough for a smooth sliding out of the sidebar 310. However, since here the portion being displaced by the sidebar 520 is a snapshot 525, no re-layout is necessary.

FIG. 5D shows the visible display 500 after this step 460. As shown in the miniature representation of FIG. 5D, the first layer 505*i* is unchanged and the sidebar 515*i* of the first layer remains displayed. However, in the second layer 510*i* the sidebar 520*i* also is displayed, shifting the snapshot 525*i* away from the first side. However, because the placement of the shifted snapshot 525 is determined based on the location information determined 450 after the first layer is updated 440 (e.g., per FIG. 5A'), the snapshot 525 may be shifted by a distance that is not equal to the width of the sidebar 520. For example, as shown in the miniature representation of FIG. 5D, snapshot 525*i* has been shifted by only about half the width of the sidebar 520*i*, such that sidebar 520*i* overlaps it by about half of the sidebar 520*i* width, with the location of the first (left) edge of the snapshot 525*i* shown as a fine dotted line. Likewise, a similar width 530*i* of the snapshot 525*i* has shifted past the edge of the visible display 500, as shown by hash lines in portion 530*i*. Thus, the snapshot 525 has been shifted into a location that aligns with the location of the updated first layer as determined in step 450, and shown in FIG. 5A'.

Figure 5E:
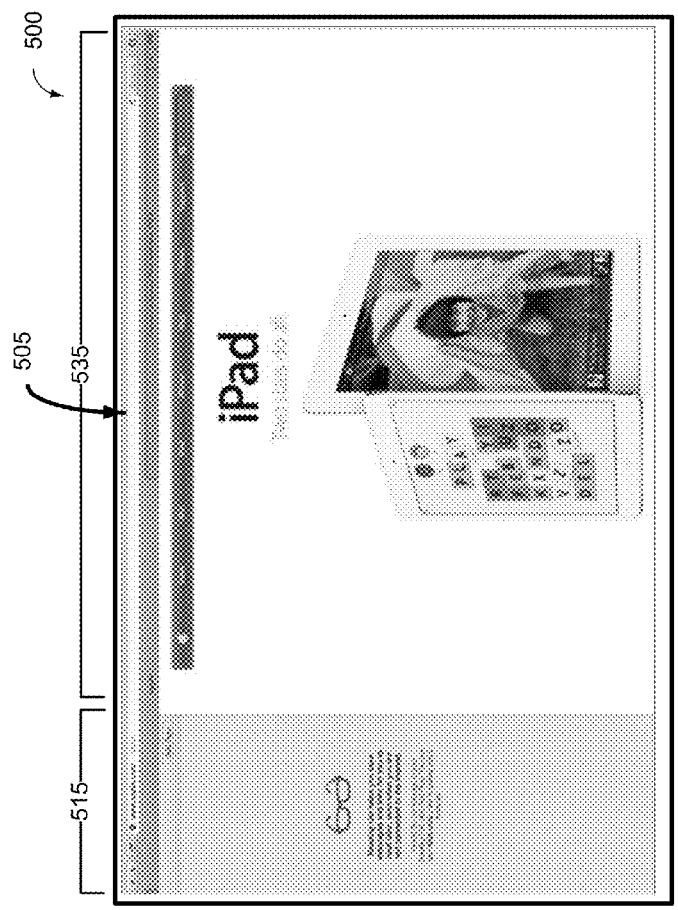
Figure 5E:
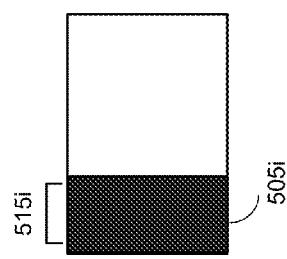
Figure 6:
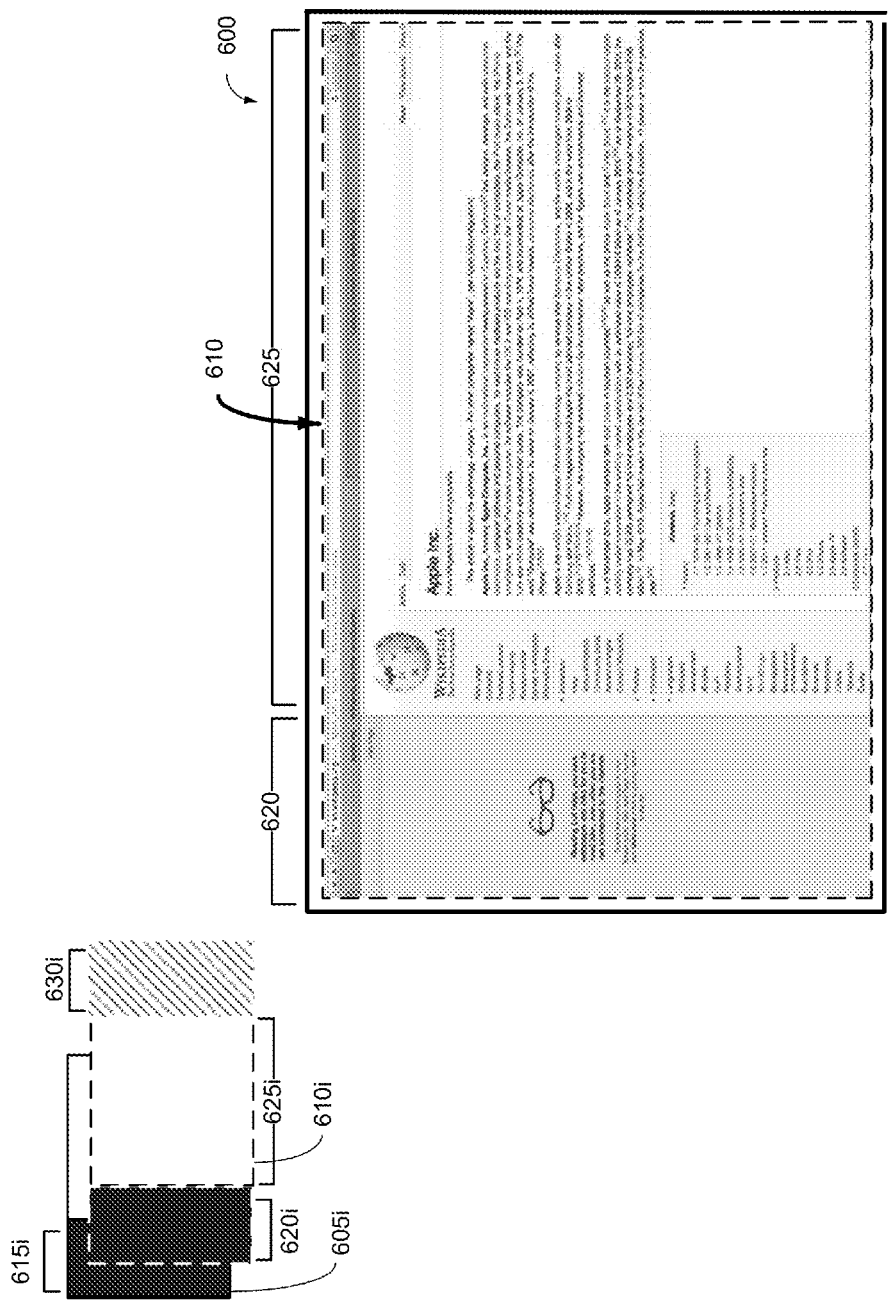
FIG. 6 illustrates various configurations of a GUI as it appears during the various steps of FIGS. 4A and 4B.

Referring briefly to FIG. 6, a web page 600 is displayed, with a second snapshot layer 610 obscuring a first layer 605, similar to FIG. 5D. In this example, a different web page 600 with the dominant page portion off to one side of the page 600 is shown (i.e., the dominant page portion is not in the center of the page 600). As shown in the miniature representation of FIG. 6, the first layer 605*i* is unchanged and the sidebar 615*i* of the first layer remains displayed. However, in the second layer 610*i* the sidebar 620*i* also is displayed, shifting the snapshot 625*i* away from the first side. Here, the snapshot 625 is shifted by a distance equal to the width of the sidebar 620, unlike in FIG. 5D. For example, as shown in the miniature representation of FIG. 6D, snapshot 625*i* has been shifted by the width of the sidebar 620*i*, such that a width 530*i* of the snapshot 625*i* equal to the width of the sidebar 620*i* displacing it, has shifted past the edge of the visible display 600, as shown by hash lines in portion 630*i*. Thus, the snapshot 625 has been shifted into a location that aligns with the location of the updated first layer as determined in step 450. Since the location of the original dominant page portion of web page 600 is different than that of FIG. 5 (500), the snapshot aligned in a different location between these two examples.

As a final step, the visible display 500 is updated 470 to remove the second layer 510, revealing the first layer 505 below it in the same location. FIG. 5E shows the visible display 500 after this step, which step 470 is not visually apparent to the user. However, as shown, it is not the first layer 505 that is visible, and the miniature representation of FIG. 5E shows only a single, first layer 505*i*.

FIG. 4B illustrates a method of an animation decreasing web page content width according to one embodiment. The method is triggered upon receiving a user action to display a sidebar. According to this embodiment, the browser 125 preliminarily identifies whether the displayed web page layout has a centered portion framed by side gutter portions, and if so, determines 415 the locations of the centered and side gutter portions (e.g., by the DOM processing module 135 and rendering module 140, as described above in conjunction with FIG. 1). The case in which the displayed web page does not have a centered portion/side gutter portion layout, the method reverts to that described in conjunction with FIG. 4A.

Figure 3D:
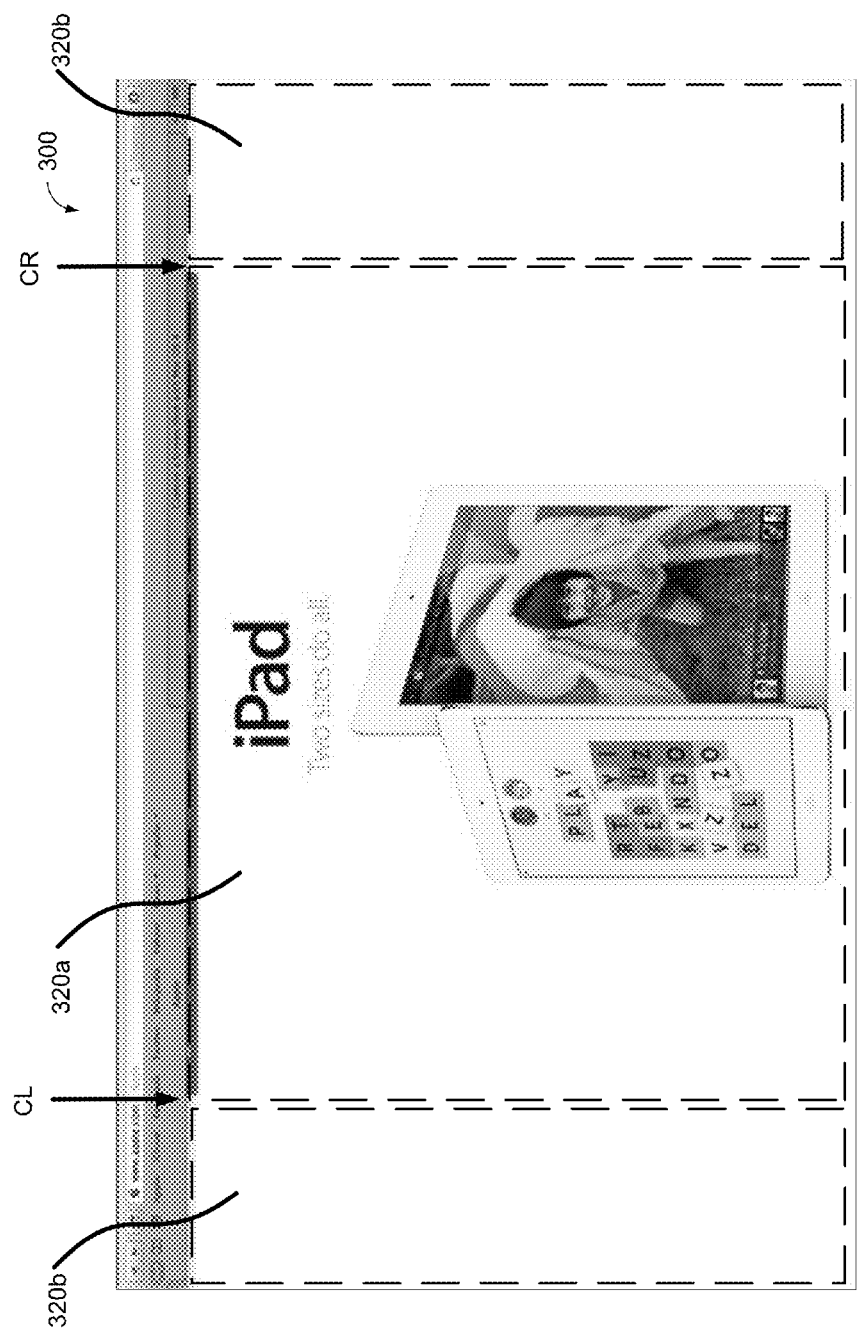

FIG. 3D illustrates a user interface for a browser 125 displaying a web page 300 overlaid with dash-line boxes 320 showing a centered/side gutter layout. The dashed line boxes 320 overlaid on the page 300 are shown to illustrate the likely node-based containers on the page for discussion herein, but are not shown on the actual web page 300. In the layout shown, there is a centered node-based portion 320*a*, and two side gutter portions 320*b*. In this example, it is relatively easy to determine 415 the centered portion 320*a* and the side gutter portions 320*b* of the page, as these are the only portions shown. Thus, the browser 125 need only identify the X coordinate of the left and right edges of the center portion, shown in FIG. 3D as center left (CL) and center right (CR). This step is accomplished, e.g., by the rendering module 140, which during layout determines the size and position of all elements from the DOM tree so they can be rendered. However, other web pages have designs that are less simple from the standpoint of layout of the node-based containers.

Figure 7A:
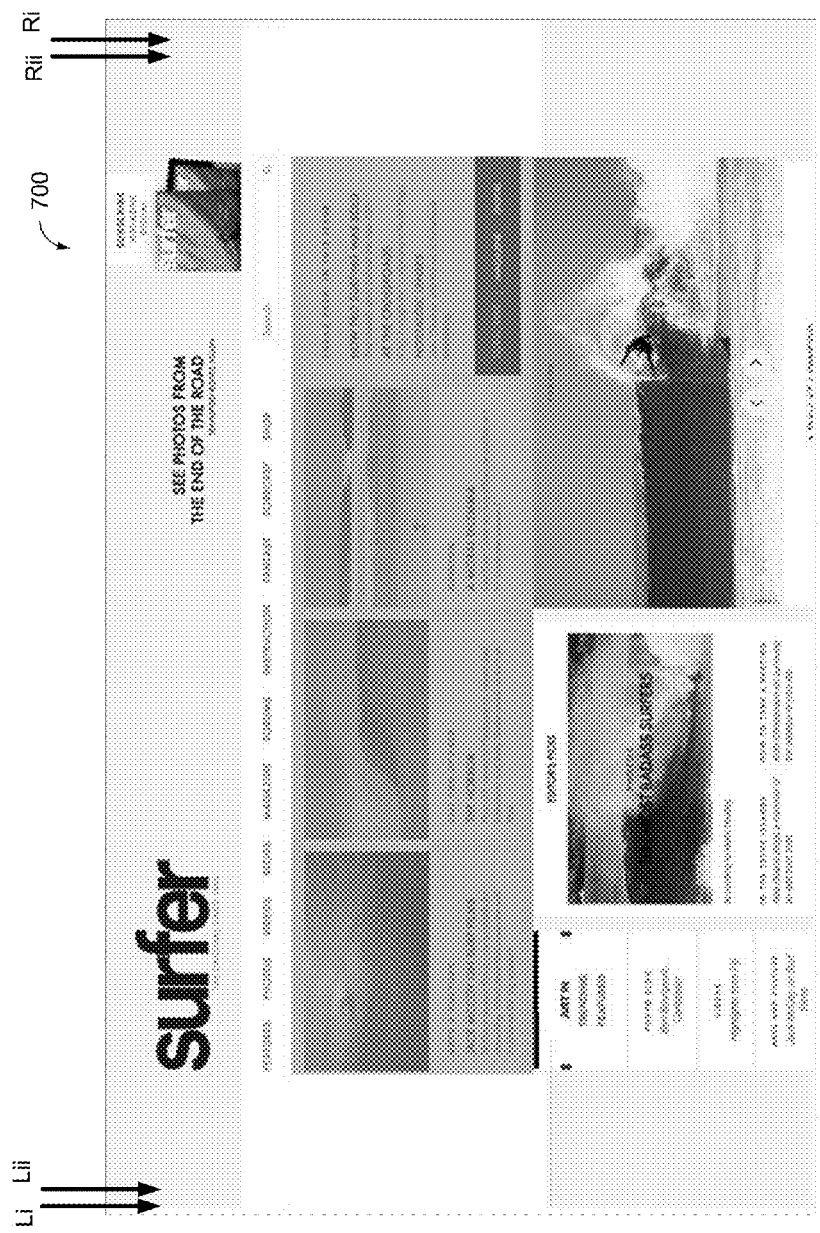
FIGS. 7A-7C illustrate various configurations of a GUI as it appears during the various steps of FIGS. 4A and 4B.
Figure 7B:
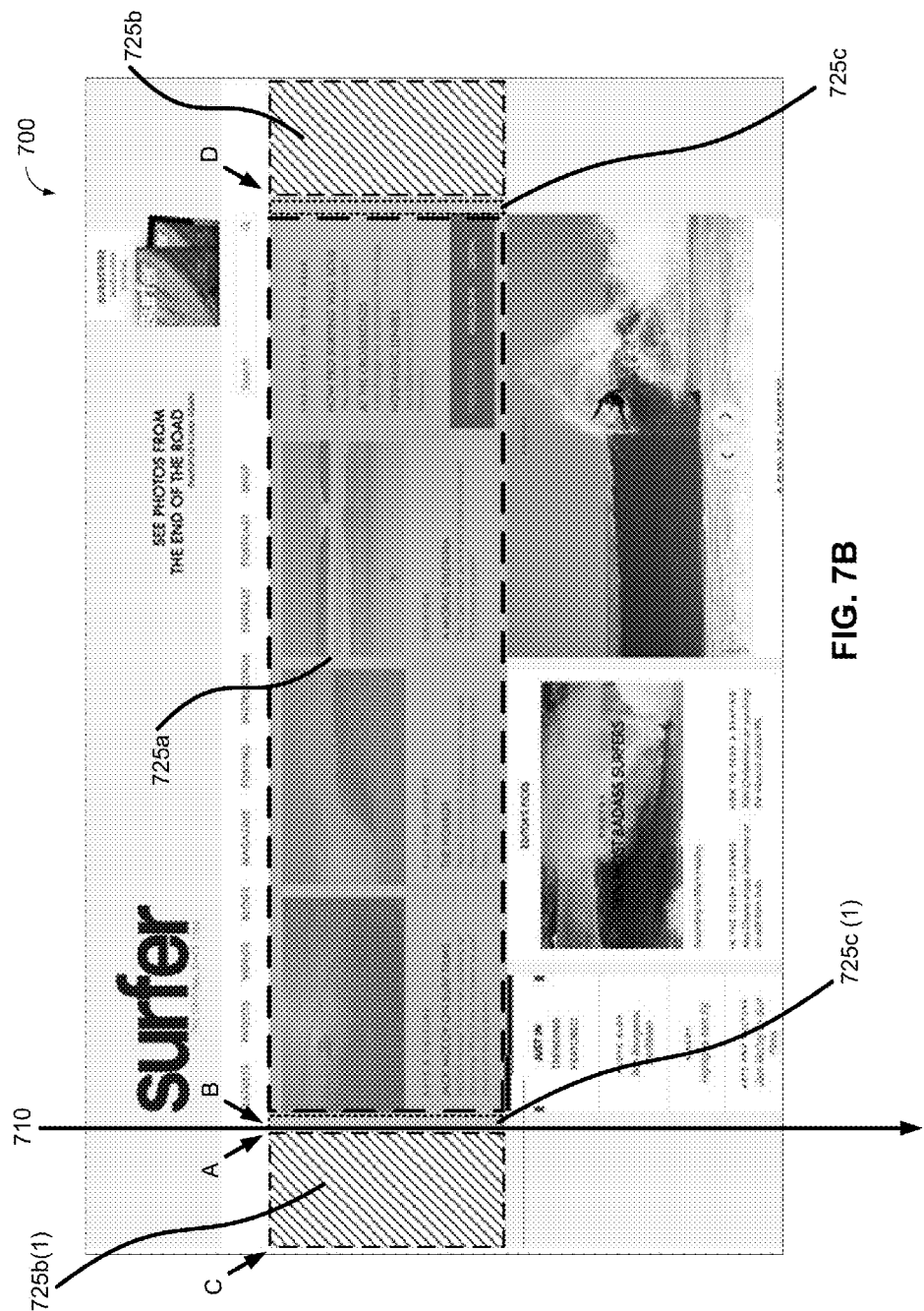

FIG. 7A illustrates a GUI for a browser 125 displaying a magazine web page 700. The layout of the web page 700 is more complicated than the web page 300 of FIG. 3, although the difference is difficult to see just by looking at a screenshot the web page 700. FIG. 7B shows the same web page with dashed line boxes 725 overlaid on the page 700, which are shown to illustrate the likely node-based containers on the page for discussion herein, but are not shown on the actual web page 700. The overlay shows a center portion 725*a* and side gutter portions 725*b* like in FIG. 3D, but also an interim portion 725*c* not present in the example in FIG. 3D.

In this example, in order to determine 415 the centered 725*a* and side gutter 725*b* portions of the page 700, the browser 125 identifies the coordinates of the left edge of box 725*c* (1) (labeled A), and the right edge of box 725*b*(1) (labeled B), defining as a vertical plane 710 (of known X coordinate), shown as a solid arrow vertical down the page. This plane 710's left edge is the point (X coordinate) at which—if the page was being resized to make its width smaller—the browser's layout engine stops consuming from the left side gutter 725*b* (and identical similar amount from the right side gutter 725*b*) to reduce the width, and instead begins concealing the rightmost part of the centered portion 725*a* of the page 700. Identifying this vertical plane 710 (and it's corresponding X coordinate) allows the browser 125 to identify the width of the side gutters 725*b*, e.g., on the left side, the distance between the leftmost edge of the web page 700 (labeled C) and the right edge of the vertical plane 710 (labeled A). A similar plane and gutter width determination can be made on the right side of the web page 700.

Figure 7C:

Referring again to FIG. 4, as a part of the gutter determination 415, the browser 125 compares the widths of the left and right side gutter portions 725*b* to a predetermined threshold width. In this example, the threshold width 730 is one half of the width 720 of the sidebar 715 to be displayed, as shown in FIG. 7C. The browser 125 determines 415 the width of the side gutter portions 725*b* by pairwise comparing each column of pixels Ln in the left side gutter portion with the corresponding column of pixels Rn in the right side gutter portion working inward from the outermost edges of the page 700, and also compares each column to the preceding column (Ln−1 and Rn−1, respectively) to see if they are substantially the same. For example, column Li and Ri have pixels Li,j and Ri,j. where i covers some number of columns to compare, and where j runs from 0 (top pixel in the column) to N (bottom pixel in the column). The browser 125 determines if Li,j is equal to Ri,j. If an entire column is a match, the browser 125 iteratively moves "inward" (on the left side, move one column to the right, and on the right side move on column to the left), comparing each column in turn. This process continues iteratively until the maximum width of columns substantially identical between the left side gutter portion and the right side gutter portion is identified. For example, if Li,j is not the same as Ri,j, the browser stops because a non-matching column has been identified (indicating a change in the image). The previously identified substantially identical column then is used as the limit of the left and right gutters.

In the example shown in FIG. 7A, column Lii is compared to corresponding column Rii to see if they are substantially identical. In addition, column Lii is compared to column Li (and Rii to Ri), to see if Lii is also substantially identical to the preceding column. The maximum width has been reached when either of these comparisons (i.e., left/right corresponding column, current/preceding column) do not match in the next comparison. These substantially identical columns collectively define the gutter portions 725*b* of the page.

For example, a simplified letter representation of a first set of gutters, as an alphabetical gradient going down the page, is:

AAAA_____AAAA
BBBB_____BBBB
CCCC_____CCCC
DDDD_____DDDD
EEEE_____DDDD

As shown, each column, proceeding from the outside in, is a match: far left column ABCDE, matches with far right column ABCDE. In addition, each next column moving toward the inside matches the one before it: far left column ABCDE matches second from left ABCDE. These columns could be considered substantially identical and thus the gutter width would be four pixels.

A second example of a simplified letter representation of set of gutters, as an alphabetical gradient going down the page, is:

ABCD_____DCBA
ABCD_____DCBA
ABCD_____DCBA
ABCD_____DCBA
ABCD_____DCBA

Here again each column, proceeding from the outside in, is a match: far left column AAAAA, matches with far right column AAAAA. However, each next column moving toward the inside does not match the one before it: far left column AAAAA does not match second from left BBBBB. Thus, the substantially identical columns would stop at the outermost columns AAAAA, and the gutter width would be one pixel.

This pixel-based analysis compares the color values of the pixels to see if they are substantially identical. Substantially identical, as used herein, means that the pixels' red, green, and blue components differ by no more than some predetermined threshold. For example, the threshold may be that there is no greater than 3% of a variance between the components of the pixels. The predetermined threshold may vary, e.g., based on differences in texture and gradient banding that are not in fat identical but also are not visually perceptible to the human eye as different. Alternatively to step 415, a DOM-based technique could be used to determine the layout, e.g., as described above in conjunction with step 410 of FIG. 4A.

Returning now to FIG. 4B, the next steps are identical to those of FIG. 4A, i.e., capture 420 a snapshot of the webpage and place 430 the snapshot as second layer in front of the first layer. Next, the first layer is updated 445, however the process is different from the updating 440 of FIG. 4A.

In the example shown in FIGS. 7A-7C, the pixel width of each side gutter 725*b* is compared 445 to the threshold width, i.e., half the width of the sidebar 715. If the gutter width is equal to or less then the threshold width, the browser reduces 455 the gutter portion 725*b* widths by 50% (one-half). Thus, if the width of the side gutter is 100 pixels, it is reduced to 50 pixels. Concurrent with the reduction of the gutter width, the browser shifts 465 the center portion, i.e., resetting its left and right edges by the same offset as the half gutter width. Thus, the left edge of center (e.g., CL of FIG. 3D) X coordinate value changes to the left position plus half of the gutter width, and the right center edge X coordinate value (e.g., CR of FIG. 3D) changes to the right center position plus half the gutter width. Also concurrent with the reduction of the gutter and shift, the sidebar 715 is displayed 467, the shifting resulting in the correct amount of room displaced form the gutters to accommodate the width of the sidebar 715.

If the side gutter portions 725*b* do not meet the threshold width, then they each can be reduced in width by an amount (number of pixel widths) less than half of the sidebar 715 width, which will not provide sufficient room for the sidebar 715 to be displayed 467. In that case, additional width reduction will need to take place on other elements, by reducing the rightmost edge of the centered portion 725*a*. The reason this method reduces the rightmost edge is to emulate what the rendering module 140 would do if it could do a live resize of the web content throughout each frame of the animation. For example, based on a left-to-right (LTR) read web page 700 set up, which that has more static content on the left side of the page 700 and more variable content on the right side of the page, the web browser 125 would reduce the rightmost edge in response to the window being resized smaller than necessary (horizontally) to show all of a page's content (i.e., content with a greater width). For a right-to-left web page (not shown), the additional width reduction would take place at the leftmost edge of the centered portion, as RTL pages have more static content on the right side of the page, that side being the side that reading starts from. As used herein, the side of the page that reading begins from in the "near" side, and the side that is read across to is the "far" side, e.g., for LTR pages left is near and right is far. Regardless of which direction the browser would do this in the context of a live resize of the web content, the browser 125 of the methods described herein moves the far edge portion beyond the visible portion of the page to emulate a live resize of web content by a browser.

Concurrent with the reduction 455 that is less than the threshold width is a shift 465 of the centered portion 725a to the far edge of the page in an amount equal to the threshold (sidebar) width, minus the width by which the right side gutter 725b has been reduced. E.g., if CL and CR are the respective X coordinates of the near (left) and far (right) edges of the center portion, G is the gutter width, and S is the sidebar width this shift can be represented as CL(new)=CL+S−(G/2) and CR(new)=CR+S−(G/2). If the side gutter widths are less than half of the threshold (sidebar) width, the visual result will be that the centered portion 725a will shift over to the far side (right) by more than the gutter reduction, and thus content on the far side-most (rightmost) edge of the centered container 725a will be beyond the visible portion of the page. As is the objective with this entire animation simulation, this is the expected outcome if a live content resize had actually taken place. Also concurrent with the reduction 455 and centered portion shift 465 is the display 467 of the sidebar 715, sliding out from the leftmost edge of the web page to complete the animation. Finally, step 470 is the same as in FIG. 4A. The visible display is updated 470 to remove the snapshot second layer, revealing the first page below (with shifted center content).

While the determining of whether the page has a centered portion and side gutters is described herein as occurring in response to a user action to display a sidebar, it is not necessary to this method that the browser 125 wait for the user action. Alternatively, the browser 125 could monitor the page at regular intervals in anticipation of performing the animation. If such monitoring occurred, as soon as the user clicks, rendering would begin immediately, as the above-described column comparison would have already occurred.

Figure 8A:
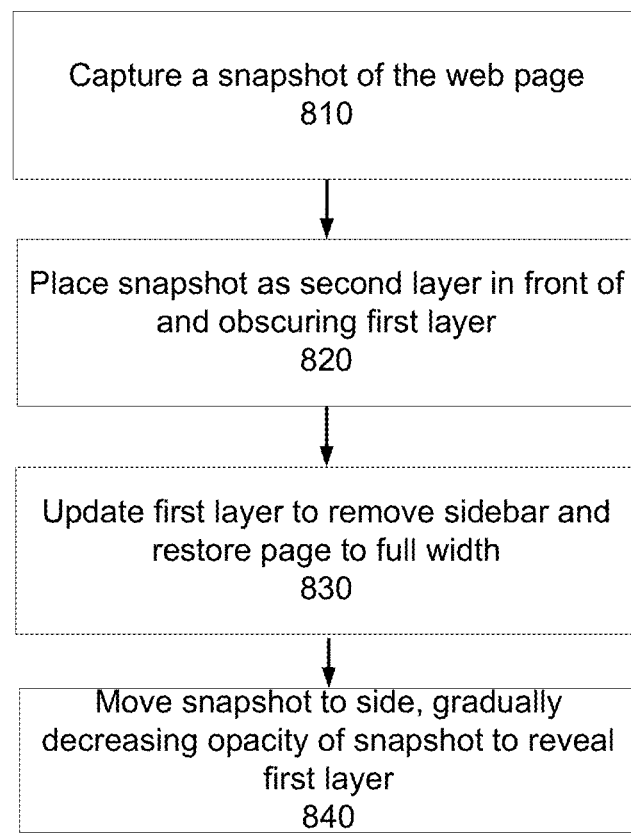
FIGS. 8A and 8B are flowcharts illustrating methods of rendering a web page during the removing of a sidebar according to one embodiment.
Figure 8B:
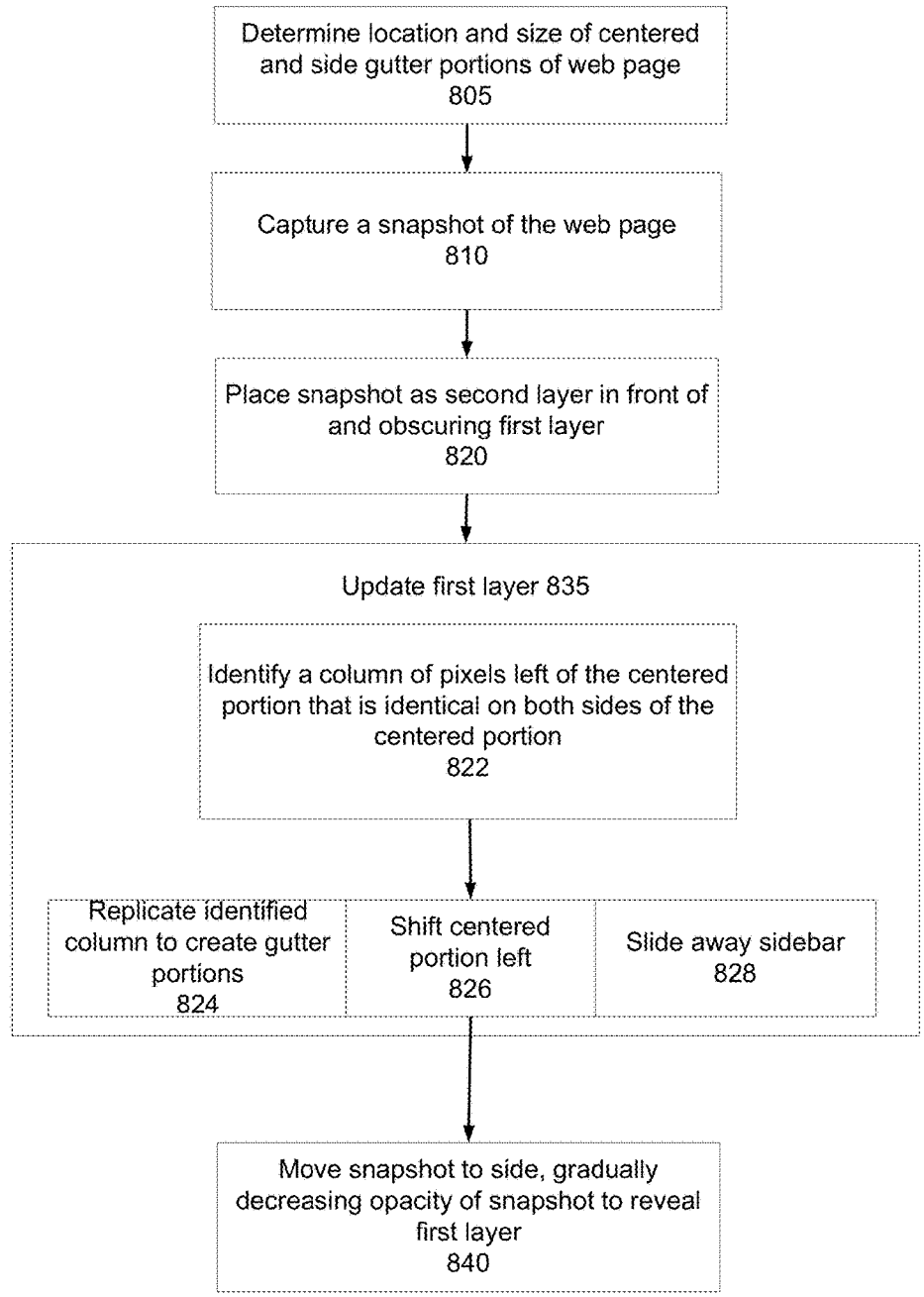

FIGS. 8A and 8B are flowcharts illustrating methods of rendering a web page during the removing of a sidebar, thereby adjusting web page content to approximate what the user would see if the browser 125 could re-layout the content fast enough to keep up with the closing of the sidebar. Referring also to FIGS. 5E, 9A-9C, and 5A, various configurations of a graphical user interface (GUI), each figure representing the GUI as it appears during the various steps of FIGS. 8A and 8B.

Figure 9A:
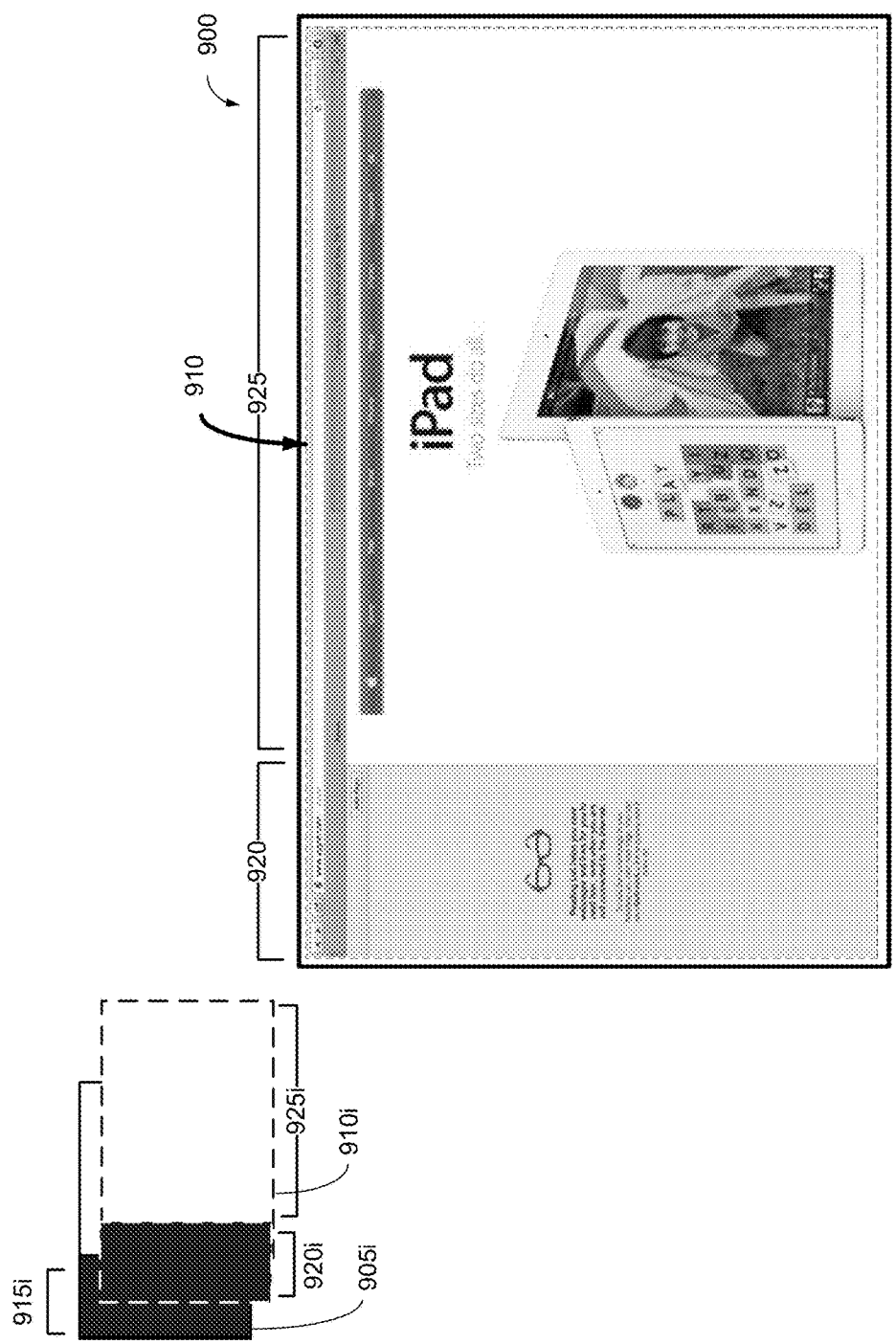
FIGS. 9A-9E illustrate various configurations of a GUI as it appears during the various steps of FIGS. 8A and 8B.

FIG. 8A illustrates a method of an animation increasing web page content width according to one embodiment. The method is triggered upon receiving a user action to remove a sidebar. As shown in FIG. 5E, a web page is displayed as first layer 505 of a visible display 500 of a user interface, including a displayed sidebar 515. The user action to remove the sidebar 515 may be, e.g., via a control such as button 507 shown in FIG. 5A. The first step of the method of FIG. 8A is capturing 810 a snapshot of the webpage 500. This step is similar to the snapshot capturing step 420 of FIGS. 4A and 4B. Then, the snapshot is placed as a second layer in front of the first layer, obscuring it. FIG. 9A shows the user interface after this step. As shown, snapshot 910 is in placed 820 front of first layer 905, such that it is not visible. For each of FIGS. 9A-9C, a miniature representation of the web page layers is shown at the top left corner. As shown in the miniature representation of FIG. 9A, the snapshot layer 910i (dotted outline) is in front of the web page first layer 905i.

Figure 9B:
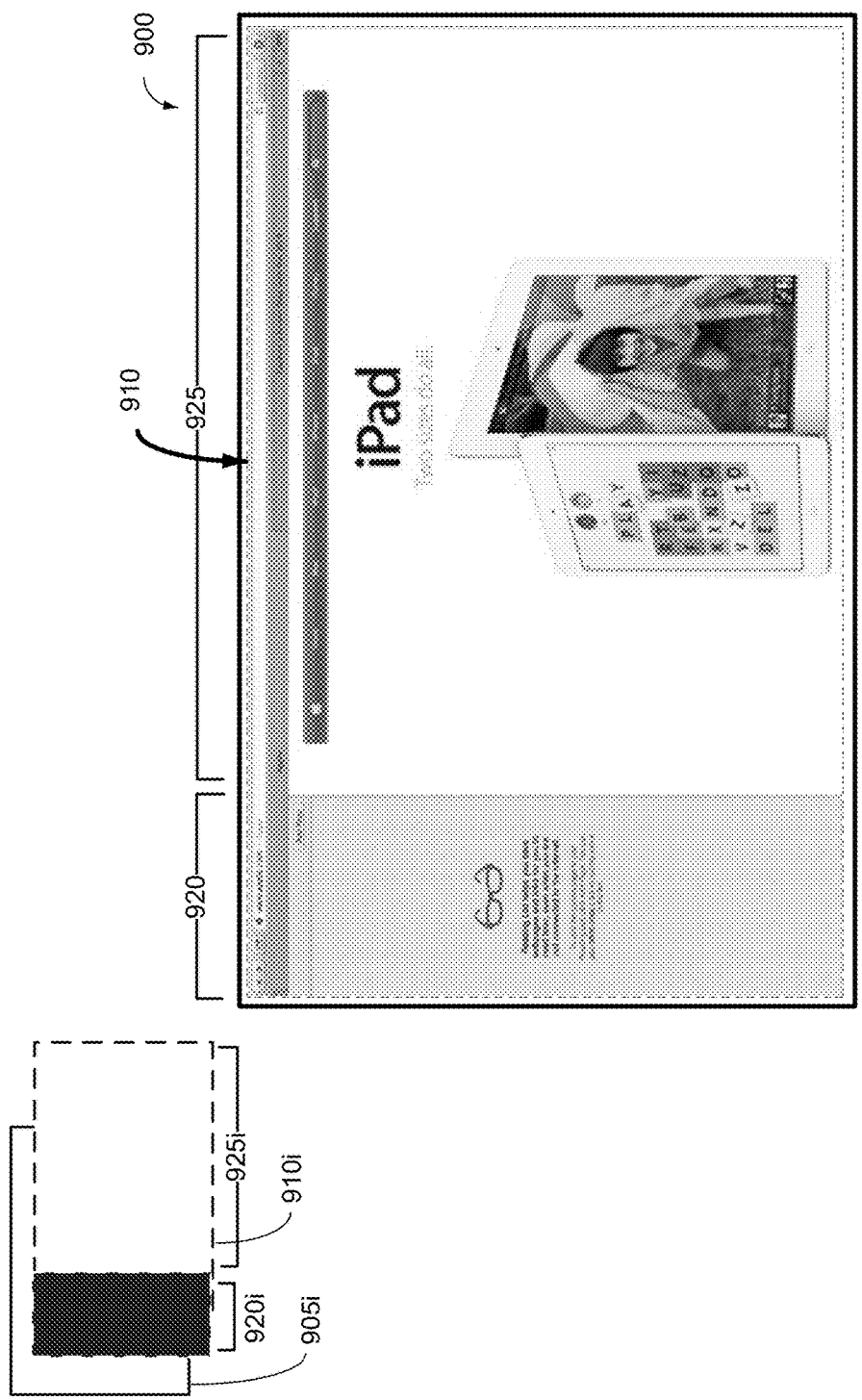

Next, the first (obscured) layer 905 is updated 830 to remove the sidebar and restore the first layer 905 web page content to its full width. If any visual jitter happens upon this resizing, it is not visible to the user since it is the first (back) layer 905. As shown in FIG. 9B, this step 830 is not visually distinguishable to the user from the previous step. However, as shown in the miniature representation of FIG. 9B, the sidebar 915i of the miniature first layer has been removed. Because the first layer 905 is behind the second snapshot layer 910, the change in the first layer 905 is obscured.

As a final step, the visible display 900 is updated 840, sliding the second layer 910 to one (e.g., left) while gradually reducing the opacity of the second layer 910, revealing the first layer 905. Because the second layer 910 being slid it a snapshot, no re-laying out of the web page content is required. The end result is that only the first layer 905 that is visible, with no sidebar 915, e.g., as shown in FIG. 5A.

FIG. 8B illustrates a method of an animation increasing web page content width according to one embodiment, e.g., by closing the sidebar. The method is triggered upon receiving a user action to remove a sidebar. In response to receiving a user action to hide a displayed sidebar, the browser 125 preliminarily identifies 805 whether the displayed web page layout has a centered portion framed by side gutter portions. In the case in which the displayed web page does not have a centered portion/side gutter portion layout, the method reverts to that described in conjunction with FIG. 8A.

If the page does have a centered portion, the next steps are identical to those of FIG. 8A, i.e., capture 810 a snapshot of the webpage and place 820 the snapshot as second layer in front of the first layer. Next, the first layer is updated 835, however the process is different from the updating 830 of FIG. 8A. As a first step in the updating, the browser 125 identifies 822 a column of pixels just at the edge of the web content next to the displayed sidebar. In order to slide the sidebar closed, the browser needs to identify content to fill columns of the web page that will be 'vacant' as a result of the sidebar sliding in, thereby reducing the occupied with of the page. Referring briefly to FIG. 9D, the image is a representation of a web page 900 that shows a layout with a side bar 915 and web content 930. A pixel width column 940 is shown per the identification 822 step, as the last pixel column on the first (left) side of the web content 930, nearest the sidebar 915. If the side bar 915 is removed, the identified column of the web content 930 can be replicated 824 by the browser 125, as the centered portion is shifted 826 left and the sidebar slid away, to create gutter portions on each side of the centered content until it fills the gutter widths. FIG. 9E illustrates what the replication would look like if the first layer were visible, showing multiple instances of pixel column 940 in either side of the web content 930. As the miniature representation shows, none of this would be visible to the user, as the updating 830 is occurring in the (obscured) first layer.

Figure 9C:
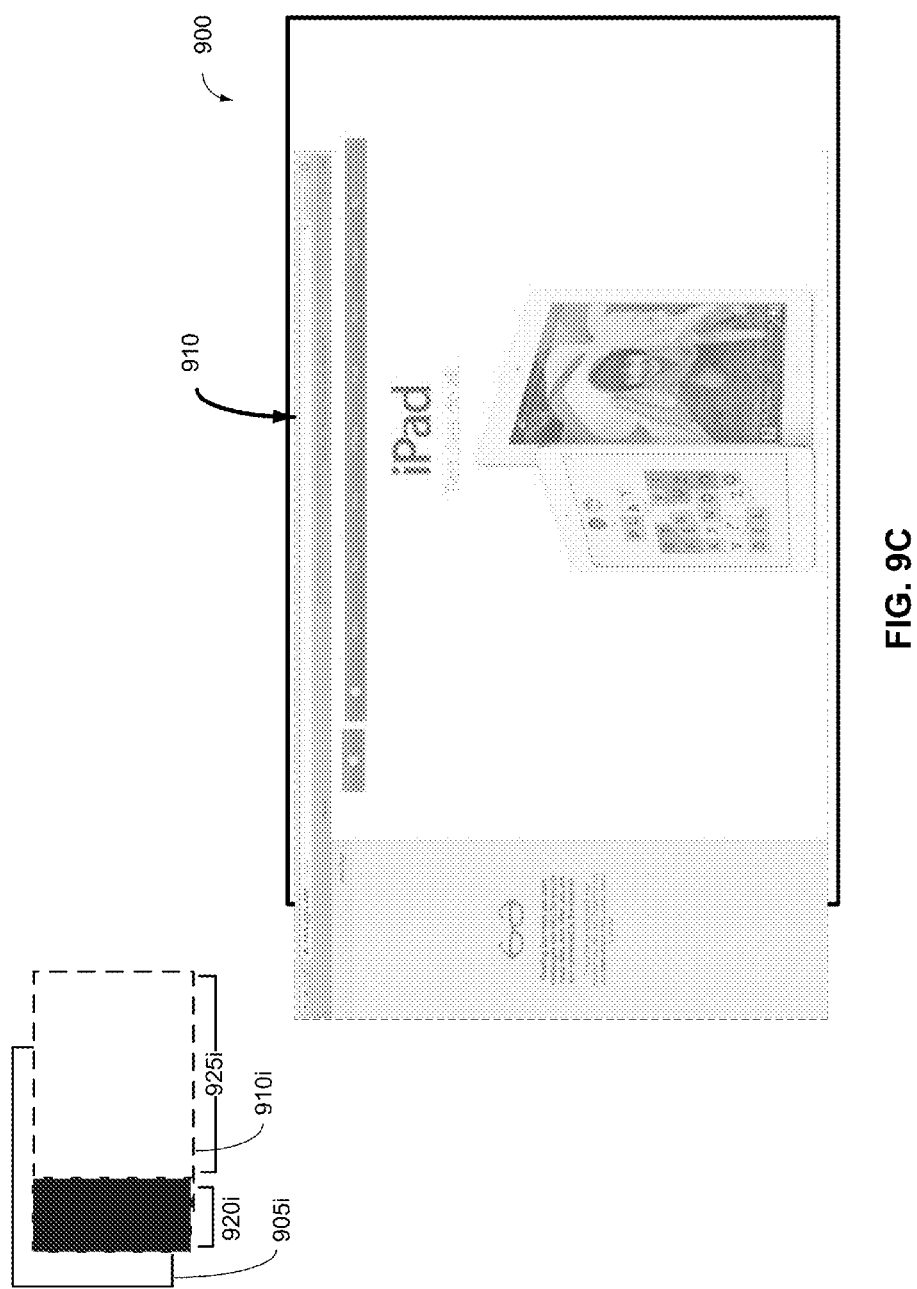
Figure 9D:
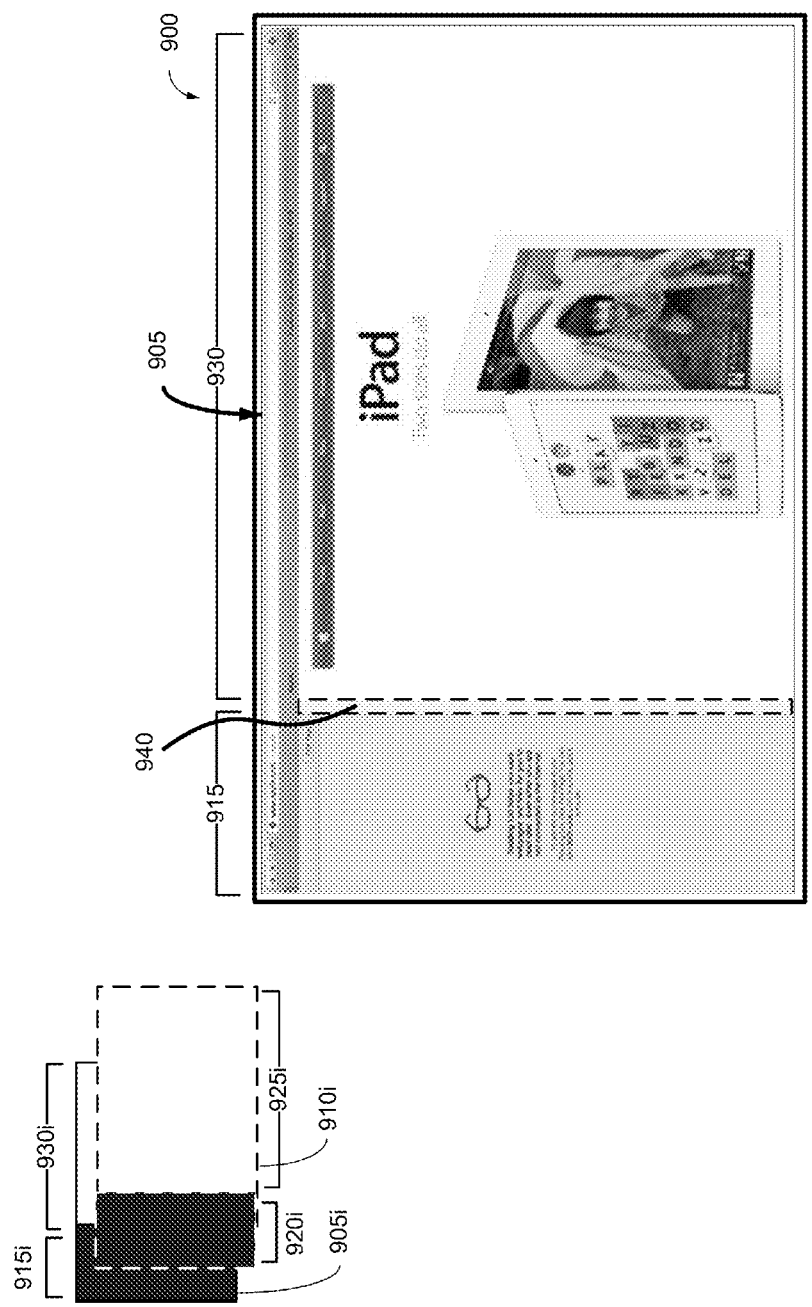
Figure 9E:
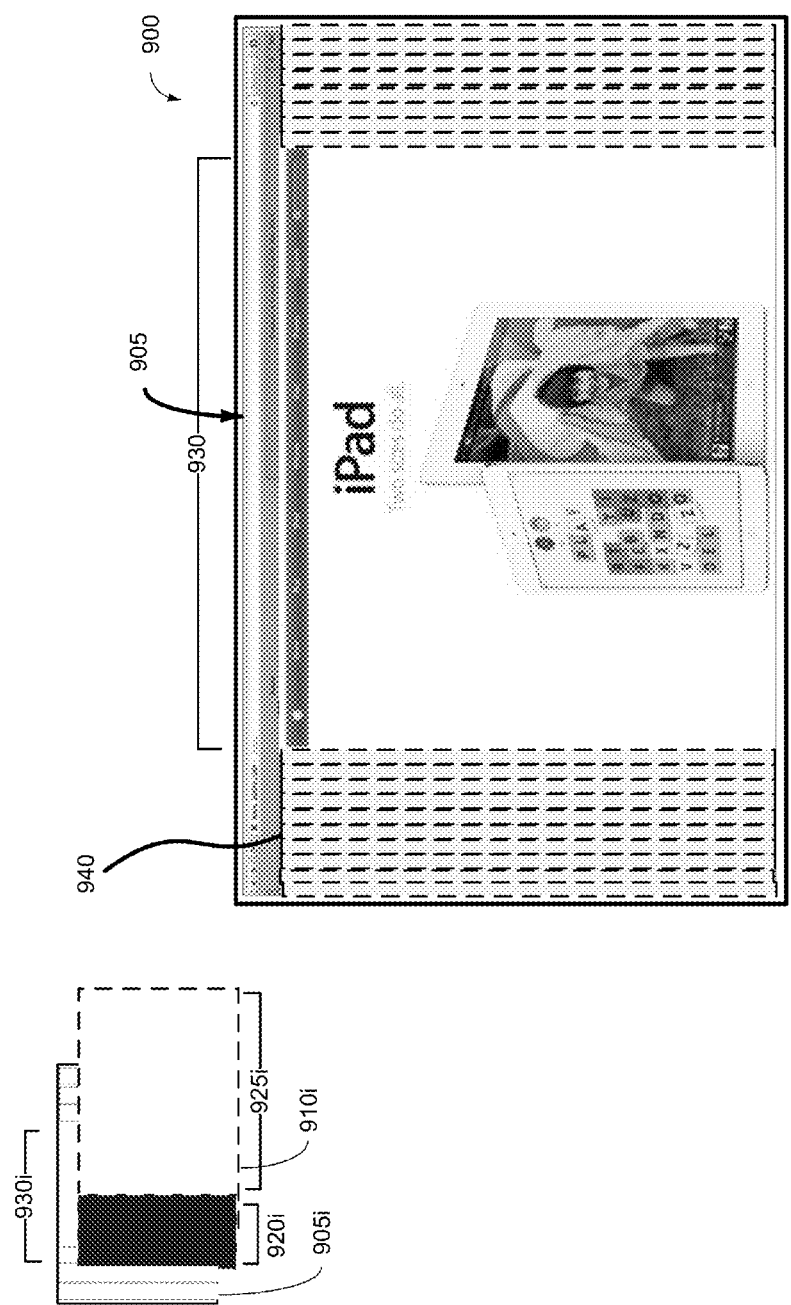

Once the first layer is updated 830, finally the snapshot is slid 840 to one (e.g., left) side, as discussed in conjunction with FIG. 8A and shown in FIG. 9C, sliding the second layer content while gradually reducing the opacity of the second layer 910, revealing the first layer 905. Because the second layer 910 being slid is a snapshot, no re-laying out of the web page content is required. The end result is that only the first layer 905 that is visible, with no sidebar 915, e.g., as shown in FIG. 5A.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method of animating web page content width resizing, the method comprising:
    in response to a user action to display a sidebar on a web page, determining location and width information about a dominant page portion of the web page as displayed in a first layer of a visible display;
    capturing a first snapshot image of the web page as displayed in the first layer of the visible display;
    temporarily placing the first snapshot image of the web page as a second layer in front of the first layer in the visible display, the second layer entirely obscuring the first layer such that it is no longer visible;
    updating the obscured first layer, comprising:
        rendering the sidebar at a first side of the first layer; and
        adjusting the location of the dominant page portion in the obscured first layer to account for the width of the rendered sidebar;
    determining updated location information about the adjusted dominant page portion in the obscured first layer;
    updating the second layer, comprising:
        replacing the first snapshot image with a second snapshot image that includes a second layer sidebar at a first side of the second layer, the second layer sidebar equal in size to the rendered sidebar in the first layer based on the updated location information; and
        shifting the second snapshot image away from the first side of the second layer by a distance based on the updated location information about the adjusted dominant page portion in the obscured first layer; and
    updating the visible display to remove the second layer, thereby revealing the first layer with the rendered sidebar and adjusted dominant page portion.

2. The computer-implemented method of claim 1, wherein determining the location and width information about the dominant page portion of the web page displayed in the first layer further comprises determining layout information for a plurality of web page portions for the web page displayed in the first layer corresponding to nodes in a document object model tree representing elements of the web page displayed in the first layer.

3. The computer-implemented method of claim 2, further comprising determining the dominant page portion as an element in the document object model tree holding the greatest amount of web page content.

4. The computer-implemented method of claim 1, wherein determining the location and width information about the dominant page portion of the web page further comprises capturing a width, a height, and x and y coordinates for the dominant page portion.

15

5. The computer-implemented method of claim 1, wherein the updating of the obscured first layer is not visible on the web page.

6. The computer-implemented method of claim 1, wherein the web page is a left-to-right read web page, and wherein the first side is the left side of the page, the second side is the right side of the web page.

7. A computer program product having a non-transitory computer readable storage medium storing executable code for animating web page content width resizing, the code when executed performs steps comprising:
   in response to a user action to display a sidebar on a web page, determining location and width information about a dominant page portion of the web page as displayed in a first layer of a visible display;
   capturing a first snapshot image of the web page as displayed in the first layer of the visible display;
   temporarily placing the first snapshot image of the web page as a second layer in front of the first layer in the visible display, the second layer entirely obscuring the first layer such that it is no longer visible;
   updating the obscured first layer, comprising:
      rendering the sidebar at a first side of the first layer; and
      adjusting the location of the dominant page portion in the obscured first layer to account for the width of the rendered sidebar;
   determining updated location information about the adjusted dominant page portion in the obscured first layer;
   updating the second layer, comprising:
      replacing the first snapshot image with a second snapshot image that includes a second layer sidebar at a first side of the second layer, the second layer sidebar equal in size to the rendered sidebar in the first layer based on the updated location information; and
      shifting the second snapshot image away from the first side of the second layer by a distance based on the updated location information about the adjusted dominant page portion in the obscured first layer; and
   updating the visible display to remove the second layer, thereby revealing the first layer with the rendered sidebar and adjusted dominant page portion.

8. The computer program product of claim 7, wherein determining the location and width information about the dominant page portion of the web page displayed in the first layer further comprises determining layout information for a plurality of web page portions for the web page displayed in the first layer corresponding to nodes in a document object model tree representing elements of the web page displayed in the first layer.

9. The computer program product of claim 8, further comprising executable code that performs determining the dominant page portion as an element in the document object model tree holding the greatest amount of web page content.

10. The computer program product of claim 7, wherein determining the location and width information about the dominant page portion of the web page further comprises capturing a width, a height, and x and y coordinates for the dominant page portion.

11. The computer program product of claim 7, wherein the updating of the obscured first layer is not visible on the web page.

12. A system for animating web page content width resizing, the system comprising:
   a processor;
   a DOM processing module configured to, in response to a user action to display a sidebar on a web page, determine location and width information about a dominant page portion of the web page as displayed in a first layer of a visible display;
   a snapshot module configured to capture a first snapshot image of the web page as displayed in the first layer of the visible display;
   a mode based user interface configuration module configured to:
      temporarily place the first snapshot image of the web page as a second layer in front of the first layer in the visible display, the second layer entirely obscuring the first layer such that it is no longer visible; and
      update the obscured first layer, comprising:
         render the sidebar at a first side of the first layer; and
         adjust the location of the dominant page portion in the obscured first layer to account for the width of the rendered sidebar;
   wherein the DOM processing module is further configured to determine updated location information about the adjusted dominant page portion in the obscured first layer;
   wherein the mode based user interface configuration module is further configured to:
      update the second layer, comprising:
         replace the first snapshot image with a second snapshot image that includes a second layer sidebar at the first side of the second layer, the second layer sidebar equal in size to the rendered sidebar in the first layer based on the updated location information; and
         shift the second snapshot image away from the first side of the second layer by a distance based on the updated location information about the adjusted dominant page portion in the obscured first layer; and
      update the visible display to remove the second layer, thereby revealing the first layer with the rendered sidebar and adjusted dominant page portion.

13. The system of claim 12, wherein the DOM processing module is further configured to determine layout information for a plurality of web page portions for the web page displayed in the first layer corresponding to nodes in a document object model tree representing elements of the web page displayed in the first layer.

14. The system of claim 12, wherein the updating of the obscured first layer is not visible on the web page.

\* \* \* \* \*